US012658140B2

(12) United States Patent
Chien

(10) Patent No.: US 12,658,140 B2
(45) Date of Patent: Jun. 16, 2026

(54) METHODS OF COMPENSATING DISPLAY PANEL FOR REDUCING LUMINANCE DISCREPANCY

(71) Applicant: NOVATEK Microelectronics Corp., Hsin-Chu (TW)

(72) Inventor: Tso-Hua Chien, Hsinchu City (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/985,076

(22) Filed: Dec. 18, 2024

(65) Prior Publication Data

US 2025/0246147 A1 Jul. 31, 2025

Related U.S. Application Data

(60) Provisional application No. 63/627,028, filed on Jan. 30, 2024.

(51) Int. Cl.
*G09G 3/3258* (2016.01)

(52) U.S. Cl.
CPC ... *G09G 3/3258* (2013.01); *G09G 2300/0408* (2013.01); *G09G 2300/0819* (2013.01); *G09G 2300/0842* (2013.01); *G09G 2310/061* (2013.01); *G09G 2310/08* (2013.01); *G09G 2320/0233* (2013.01); *G09G 2320/0686* (2013.01); *G09G 2340/0435* (2013.01)

(58) Field of Classification Search
CPC ......... G09G 3/3258; G09G 2300/0408; G09G 2300/0819; G09G 2300/0842; G09G 2310/061; G09G 2310/08; G09G 2320/0233; G09G 2320/0686; G09G 2340/0435
USPC ........................................................... 345/205
See application file for complete search history.

(56) References Cited

U.S. PATENT DOCUMENTS

| | | | | |
|---|---|---|---|---|
| 2005/0200579 | A1* | 9/2005 | Chen | G09G 3/3666 345/87 |
| 2016/0042708 | A1* | 2/2016 | Wang | G09G 3/3611 345/214 |
| 2023/0335064 | A1* | 10/2023 | Her | G09G 3/3266 |
| 2024/0144875 | A1* | 5/2024 | Gu | G09G 3/3233 |
| 2024/0312413 | A1* | 9/2024 | Gu | G09G 3/3233 |
| 2024/0321179 | A1* | 9/2024 | Zhang | G09G 3/32 |
| 2024/0355259 | A1* | 10/2024 | Chien | G09G 3/3677 |
| 2024/0412706 | A1* | 12/2024 | Chien | G09G 3/3677 |
| 2025/0022399 | A1* | 1/2025 | Cheng | G09G 3/2092 |
| 2025/0095563 | A1* | 3/2025 | Bao | G09G 3/2096 |
| 2025/0140158 | A1* | 5/2025 | Chang | G09G 3/20 |
| 2025/0166575 | A1* | 5/2025 | Huang | G09G 3/3266 |
| 2025/0225936 | A1* | 7/2025 | Sun | G09G 3/3233 |

(Continued)

FOREIGN PATENT DOCUMENTS

| | | | |
|---|---|---|---|
| CN | 115713913 | A | 2/2023 |
| CN | 117275416 | A | 12/2023 |
| WO | 2023/221032 | A1 | 11/2023 |

*Primary Examiner* — Tom V Sheng
(74) *Attorney, Agent, or Firm* — Winston Hsu

(57) ABSTRACT

A method of compensating a display panel includes providing a refresh control signal to configure a first area and a second area of the display panel; and providing an initial signal to the display panel. The initial signal includes a first initial voltage to initialize the first area before a first data operation, and a second initial voltage to initialize the second area before a second data operation.

28 Claims, 16 Drawing Sheets

(56) References Cited

U.S. PATENT DOCUMENTS

| | | | | |
|---|---|---|---|---|
| 2025/0273126 | A1* | 8/2025 | Wang | G09G 3/20 |
| 2025/0285581 | A1* | 9/2025 | Mi | G09G 3/30 |

* cited by examiner

METHODS OF COMPENSATING DISPLAY PANEL FOR REDUCING LUMINANCE DISCREPANCY

CROSS REFERENCE TO RELATED APPLICATIONS

This application claims the benefit of U.S. Provisional Application No. 63/627,028, filed on Jan. 30, 2024. The content of the application is incorporated herein by reference.

BACKGROUND OF THE INVENTION

1. Field of the Invention

The invention relates to display technology, and specifically, to method of Methods of compensating display panel for reducing luminance discrepancy.

2. Description of the Prior Art

Light-emitting diode (LED) displays are flat panel displays that employ LEDs in arrays of pixels. Each pixel is initialized by initial voltages Vinit before display. In the related art, an LED display adopts the multi-area frame rate (MAFR) technology utilizing different refresh rates for video regions and text regions on the screen. For examples, the video regions may be displayed at a higher refresh rate than the text regions. If the screen displays the video regions and text regions simultaneously, the lower refresh rate of the text regions can lead to higher brightness in the text regions than the video regions over time, resulting in brightness unevenness across different regions on the screen, degrading the user experience.

SUMMARY OF THE INVENTION

According to an embodiment of the invention, a method of compensating a display panel includes providing a refresh control signal to configure a first area and a second area of the display panel; and providing an initial signal to the display panel. The initial signal includes a first initial voltage to initialize the first area before a data operation, and a second initial voltage to initialize the second area without performing any data operation.

According to another embodiment of the invention, a method of compensating a display panel includes providing a refresh control signal to configure a first area and a second area of the display panel; and providing a ground voltage signal to the display panel. The ground voltage signal includes a first ground voltage to operate the first area, and a second ground voltage to operate the second area. The first area is refreshed and the second area is unrefreshed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
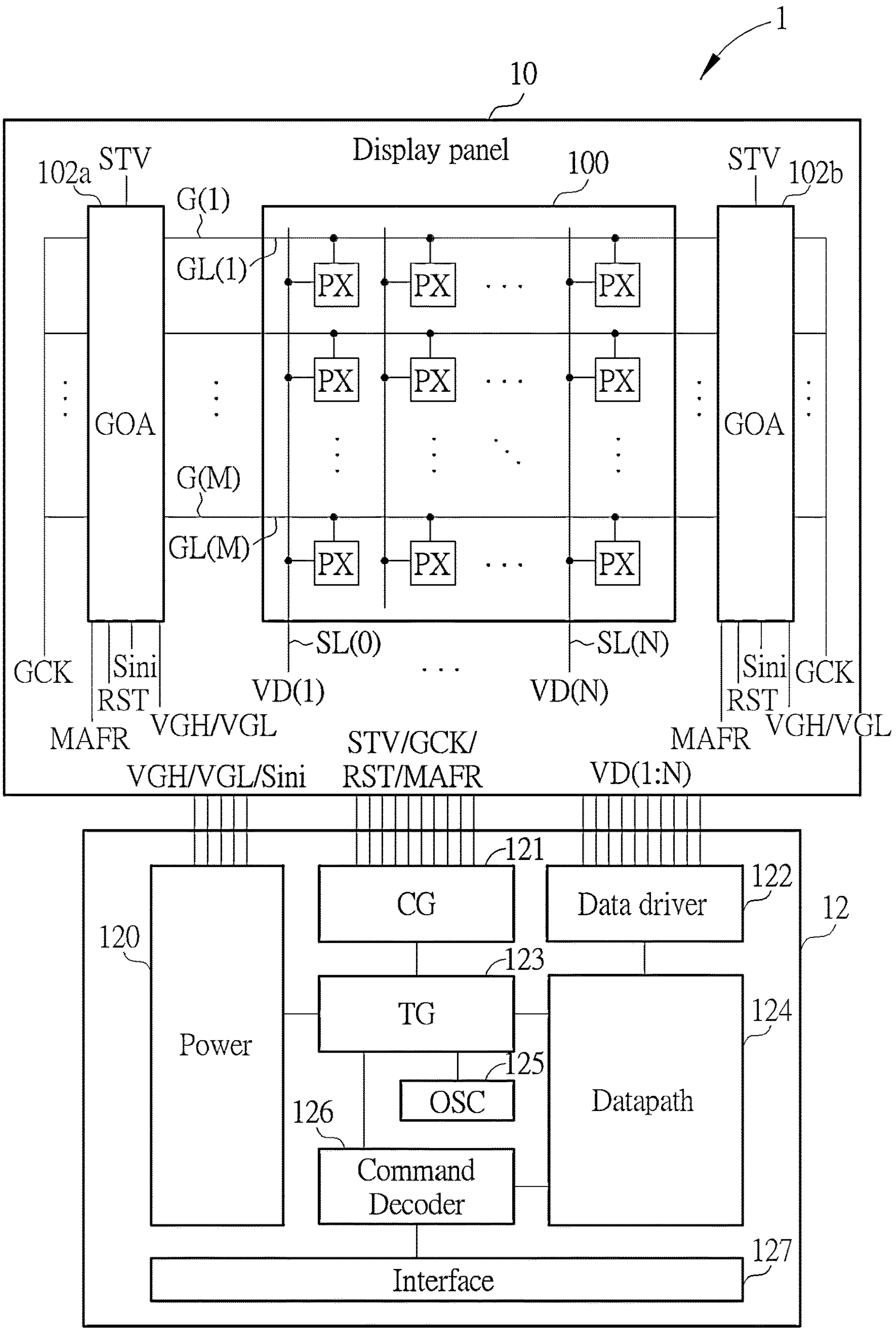
FIG. 1 is a block diagram of a display device according to an embodiment of the invention.

FIG. 1 is a block diagram of a display device 1 according to an embodiment of the invention. The display device 1 may include a display panel 10 and a control circuit 12 coupled thereto. The control circuit 12 may receive image data and control data from a host device to display an image on the display panel 10. The display panel 10 may be an organic light-emitting diode (OLED) panel. The control circuit 12 may be implemented as an independent integrated circuit.

The display panel 10 may include a pixel array 100, and gate on array (GOA) drivers **102*a* and 102*b*. The GOA drivers 102*a* and 102*b* are coupled to the pixel array 100. The pixel array 100** may include (N*M) pixels PX, source lines SL(1) to SL(N), and gate lines GL(1) to G(M), N, M being positive integers. The pixels PX may be arranged in N columns and M rows, and each pixel PX may be a red (R) pixel, a green (G) pixel, or a blue (B) pixel. The N columns of pixels PX may be coupled to the control circuit 12 via the source lines SL(1) to SL(N) to receive data signals VD(1) to VD(N), thereby displaying images. The data signals VD(1) to VD(N) may be voltage signals. The M rows of pixels PX may be coupled to the GOA drivers **102*a* and 102*b* via the gate lines GL(1) to G(M) to receive gate line voltages G(1) to G(M). Each pixel PX may be coupled to a corresponding gate line and a corresponding source line. The pixel PX may be activated by a gate signal on the corresponding gate line, and may load pixel data on the corresponding source line. For example, if N=1920 and M=1080, the pixel array 100** would include 1920*1080 pixels PX coupled to source lines SL(1) to SL(1920) and gate lines GL(1) to G(1080).

Figure 2:
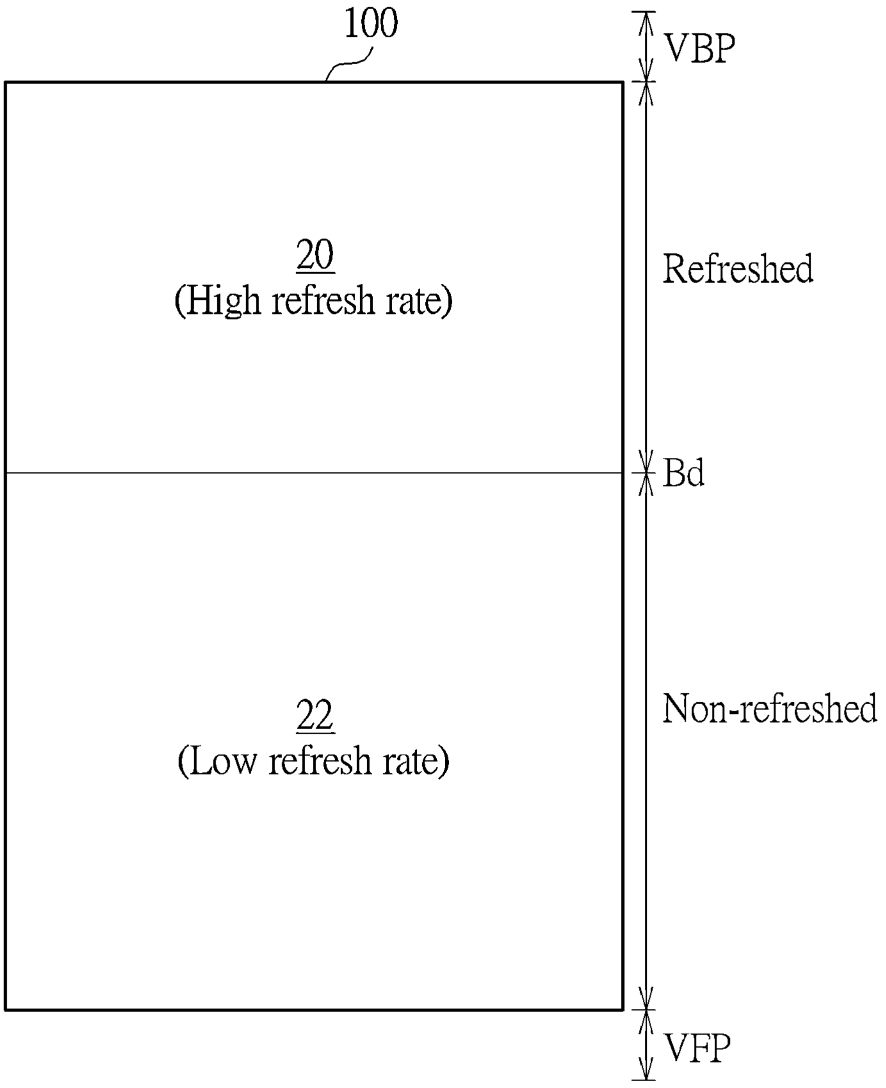
FIG. 2 is a schematic diagram of the MAFR scheme on the display device in FIG. 1, according to an embodiment of the invention.

The display device 1 may utilize a multi-area frame rate (MAFR) scheme, dividing the pixel array 100 into multiple areas updated by different refresh rates. The refresh rate allocations are dynamically adjusted based on the image content, allowing for more efficient use of resources and power. The MAFR scheme may reduce power consumption by lowering the refresh rate in low refresh rate areas, while maintaining high image quality in high refresh areas. FIG. 2 is a schematic diagram of the MAFR scheme for use by the display device 1. The pixel array 100 is divided into a high refresh rate area 20 and a low refresh rate area 22. The high refresh rate area 20 may display dynamic content that requires frequent updates, and the low refresh rate area 22 may display static content that requires less frequent updates. For example, the high refresh rate area 20 may display a video playback or gaming images at a higher refresh rate, typically at 120 Hz, ensuring smooth motion and reducing motion blur. In contrast, the low refresh rate area 22 may display background elements or user interface components at 10 Hz, reducing power consumption while saving computational resources.

The MAFR scheme may employ an efficient update ratio between the high refresh rate area 20 and the low refresh rate area 22. For every 12 data updates occurring in the high refresh rate area 20, the low refresh rate area 22 may be updated just once, providing significant power saving while maintaining appropriate display quality. Thus, out of every 12 frames, only one is a fully refreshed frame, containing pixel data for all the pixels PX in the pixel array 100. The other 11 frames are partially refreshed, containing pixel data only for the pixels PX in the high refresh rate area 20, but not the low refresh rate area 22. That is, the pixels PX in the high refresh rate area 20 are refreshed, while the pixels PX in the low refresh rate area 22 are non-refreshed in the partially refreshed frames. In FIG. 2, the pixel array 100 receives a partially refreshed frame including a vertical blanking porch interval VBP, a refreshed area, a non-refreshed area, and a vertical front porch interval VFP. The contrasting refresh rates lead to different luminance levels between the high refresh rate area 20 and the low refresh rate area 22.

Figure 5:
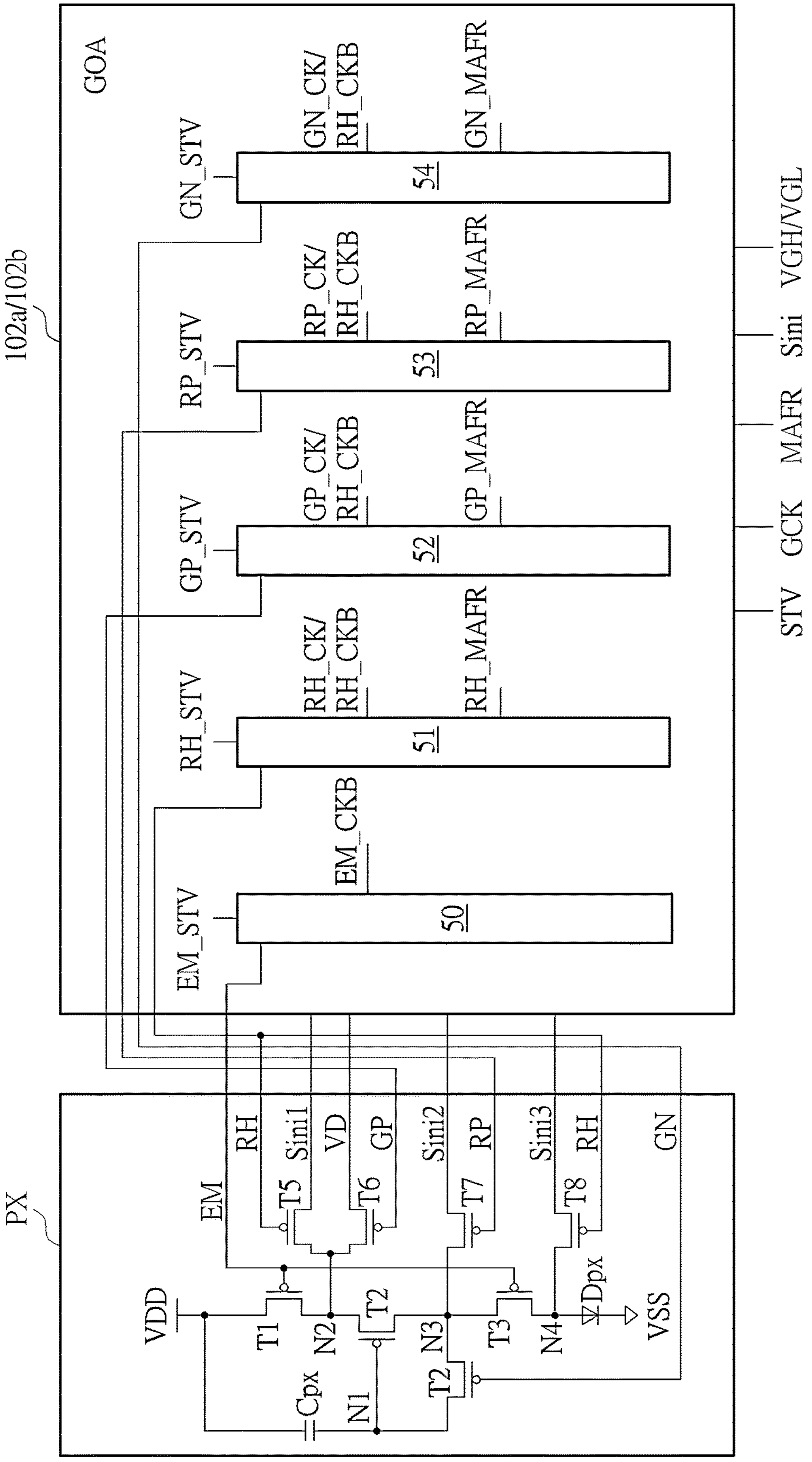
FIG. 5 is a circuit schematic diagram of the GOA driver and a pixel PX in the pixel array in FIG. 1, according to another embodiment of the invention.
Figure 6:
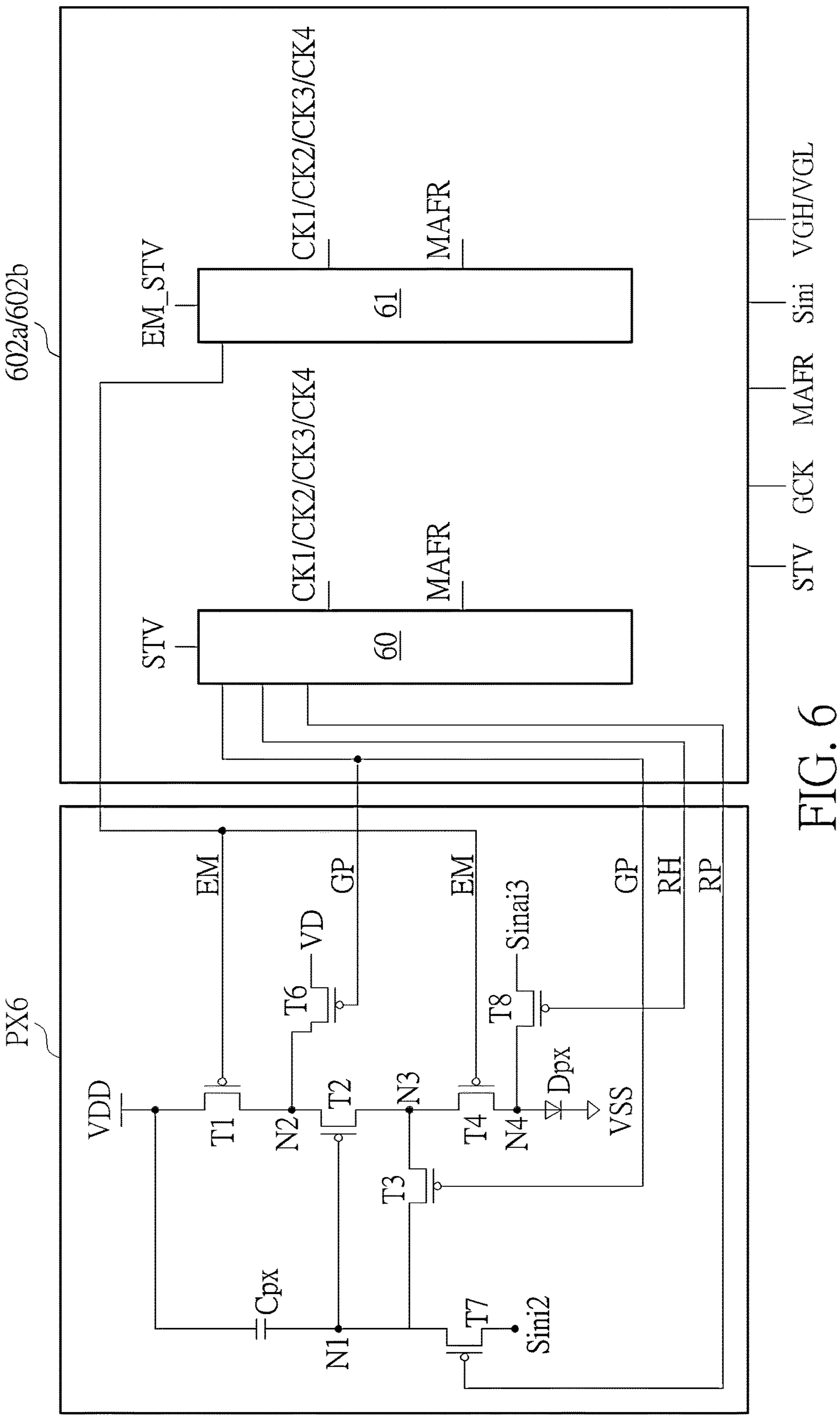
FIG. 6 is a circuit schematic diagram of the GOA driver and a pixel PX in the pixel array in FIG. 1, according to another embodiment of the invention.

In the OLED panel, each pixel PX contains a data storage capacitor that may be referenced to a supply voltage VDD at a first terminal and may receive a target data voltage at a second terminal during each data update, as shown by the capacitors Cpx in FIGS. 5 and 6. In the high refresh rate area 20, the frequent updates enable the voltage at the second terminal of the data storage capacitor to more closely match the target data voltage as the data storage capacitor gets charged during each data update, known as the resistor-capacitor (RC) loading effect. As a result, the voltage across the data storage capacitor tends to decrease over time, leading to a gradual reduction in luminance level for the pixels PX in the high refresh rate area 20.

Conversely, in the low refresh rate area 22, the pixels PX are updated less frequently. Between updates, the voltage at the second terminal of the data storage capacitor tends to decay due to current leakage. This decay occurs because the data storage capacitor in the pixel PX in the low refresh rate area 22 is only charged once over the period of several consecutive data updates (e.g., 12 data updates) in the high refresh rate area 20. As a consequence, the voltage across the data storage capacitor in the pixels PX in the low refresh rate area 22 tends to increase over time, resulting in an increase in luminance level.

The disparity in luminance levels between the high refresh rate area 20 and the low refresh rate area 22 can lead to noticeable differences in luminance levels across the pixel array 100. The high refresh rate area 20 may appear brighter than the low refresh rate area 22. These variations in luminance can potentially impact the overall visual consistency and quality of the displayed image, presenting a challenge for delivering uniform luminance across the pixel array 100.

To address the luminance disparity between the high refresh rate area 20 and the low refresh rate area 22, the display panel 10 may adopt an initial signal Sini from the control circuit 12. The initial signal Sini may be a voltage signal for initializing the pixels PX before each data update operation (data operation), ensuring the pixels PX are ready for loading data. The initial signal Sini may contain different voltage levels tailored for the high refresh rate area 20 and the low refresh rate area 22. By supplying the different voltage levels in the initial signal Sini, the display panel 10 may compensate for larger voltage drops in the pixels PX in the high refresh rate area 20 and smaller voltage drops in the pixels PX in the low refresh rate area 22, ensuring consistent luminance across the pixel array 100 regardless of refresh rate variations, enhancing the visual quality.

In some embodiments, the control circuit 12 may further adjust the supply voltage signal VGH and/or ground voltage signal VGL for use in the display panel 10, so as to compensate for the refresh rate variations in the high refresh rate area 20 and the low refresh rate area 22. The supply voltage signal VGH may contain different voltage levels for the high refresh rate area 20 and the low refresh rate area 22. Likewise, the ground voltage signal VGL may contain different voltage levels for the high refresh rate area 20 and the low refresh rate area 22. The voltage level adjustments of the supply voltage signal VGH and/or ground voltage signal VGL would be discussed further in the subsequent paragraphs.

In FIG. 1, the control circuit 12 may include a power generator 120, a clock generator (CG) 121, a data driver 122, a timing generator (TG) 123, a datapath circuit 124, an oscillator (OSC) 125, a command decoder 126, and an interface circuit 127. The interface circuit 127 may be coupled to the command decoder 126. The command decoder 126 and the oscillator 125 may be coupled to the timing generator 123. The timing generator 123 may be coupled to the power generator 120, the clock generator 121 and the datapath circuit 124. The datapath circuit 124 may be coupled to the data driver 122. The power generator 120, the clock generator 121, and the data driver 122 may be coupled to the display panel 10.

The interface circuit 127 may receive the image data and control data from the host device, and pass the image data and control data to the command decoder 126. The interface circuit 127 may be a mobile industry processor interface (MIPI), serial peripheral interface (SPI), display serial interface (DSI), embedded display port (EDP) interface, low-voltage differential signaling (LVDS) interface, or other display interfaces. The hose device may be a graphics card, smartphone, or embedded system. The image data may include visual content to be displayed on the pixel array 100. The control data may be instructions for managing display such as luminance adjustments or pixel updates. The command decoder 126 may interpret the control data to generate specific commands for the display, such as updating pixels PX, adjusting contrast, or changing display modes. The command decoder 126 may send the commands and the image data to the timing generator 123.

The oscillator 125 may generate system clocks, and transmit the system clock to the timing generator 123. The timing generator 123 may generate a vertical synchronization (Vsync) signal, a horizontal synchronization (Hsync) signal, signal, and other image control signals according to the system clock, the image data, and the commands, and forward the Vsync signal, the Hsync signal and other image control signals to the power generator 120, the clock generator 121, the datapath circuit 124, and the display panel 10. The power generator 120 may supply the display panel 10 using the supply voltage signal VGH, the ground voltage signal VGL, and the initial signal Sini according to the various image control signals for data operations. Accordingly, the power generator 120 may generates different voltage levels in the supply voltage signal VGH, the ground voltage signal VGL, and/or the initial signal Sini to compensate for the luminous disparity between the high refresh rate area 20 and the low refresh rate area 22 owing to the refresh rate variations. The clock generator 121 may generate and supply a start vertical signal STV, a clock signal GCK, a reset signal RST, and a refresh control signal MAFR to the display panel 10. The start vertical signal STV signifies the beginning of pixel data in a frame, facilitating display synchronization. The clock signal GCK may be used to selectively sample the pixel data, thereby reducing power consumption. The reset signal RST may be used to reset the GOA drivers 102*a* and 102*b*. The refresh control signal MAFR may be used to specify the locations of the high refresh rate area 20 and the low refresh rate area 22. The datapath circuit 124 may process the image data to generate pixel data. The pixel data is then fed into the data driver 122 to generate the data signals VD(1) to VD(N).

The GOA drivers 102*a* and 102*b* may receive the start vertical signal STV, the clock signal GCK, the reset signal RST, the refresh control signal MAFR, the supply voltage signal VGH, the ground voltage signal VGL, and the initial signal Sini to control the data operations of the pixels PX.

Figure 3:
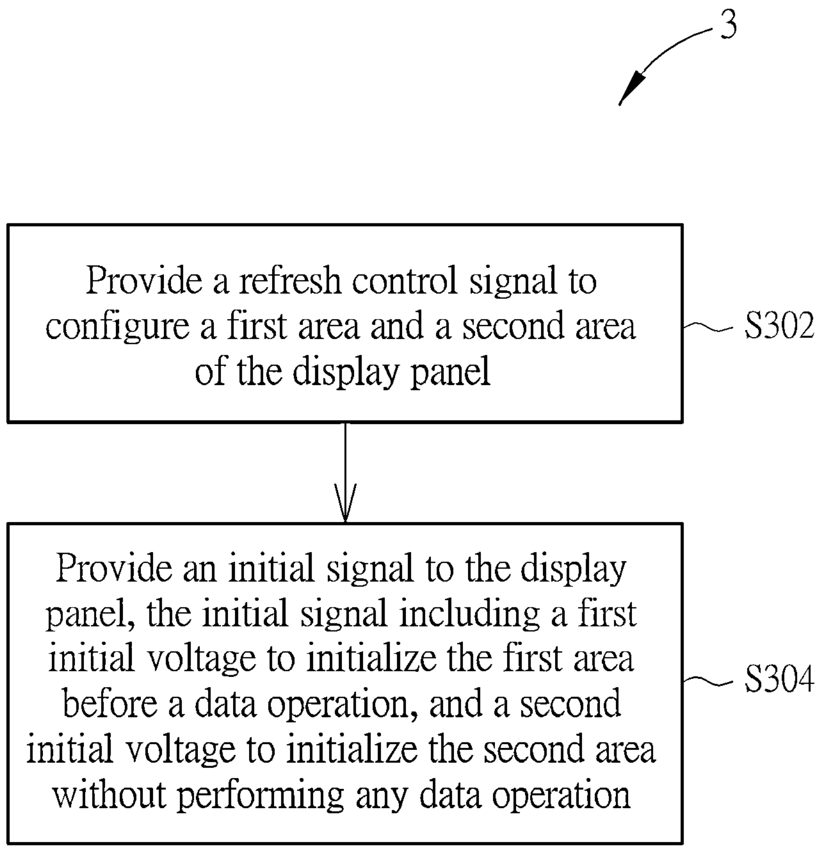
FIG. 3 is a flowchart of a method of compensating the display panel using the initial voltage signal in FIG. 1.

FIG. 3 is a flowchart of a method 300 of compensating the pixel array 100 using the initial signal Sini. The method 300 includes Steps S302 and S304, providing the voltage levels in the initial signal Sini to reduce or remove the luminance discrepancy, thereby delivering uniform luminance across the pixel array 100. Any reasonable step change or adjustment is within the scope of the present disclosure. Steps S302 and S304 are detailed as follows:

Step S302: The control circuit 12 provides a refresh control signal MAFR to configure a first area and a second area of the display panel 10; and Step S304: The control circuit 12 provides an initial signal Sini to the display panel 10, the initial signal Sini including a first initial voltage to initialize the first area before a first data operation and a second initial voltage to initialize the second area without performing a second data operation.

In Step S302, the control circuit 12 generates a refresh control signal MAFR to set the boundary between a first area and a second area. The first area may be referred to as the refreshed (scanned) area, and the pixels PX positioned in the first area may be refreshed. The second area may be referred to as the non-refreshed (non-scanned) area, and the pixels PX in the second area may remain non-refreshed. In Step S304, the control circuit 12 delivers two different initial voltages to the display panel 10 via the initial signal Sini. The first initial voltage is applied to PX in the first area, preparing the pixels PX therein for the first data operation (e.g., data update operation). Meanwhile, the control circuit 12 provides the second initial voltage to the second area, compensating for any luminance discrepancy owing to the lack of the second data operation (e.g., data update operation), maintaining consistent display performance across the first and second areas in the pixel array 100. The second initial voltage is different from the first initial voltage. In this fashion, the control circuit 12 may adjust the initial signal Sini to balance the visual luminance of the entire pixel array 100.

Figure 4:
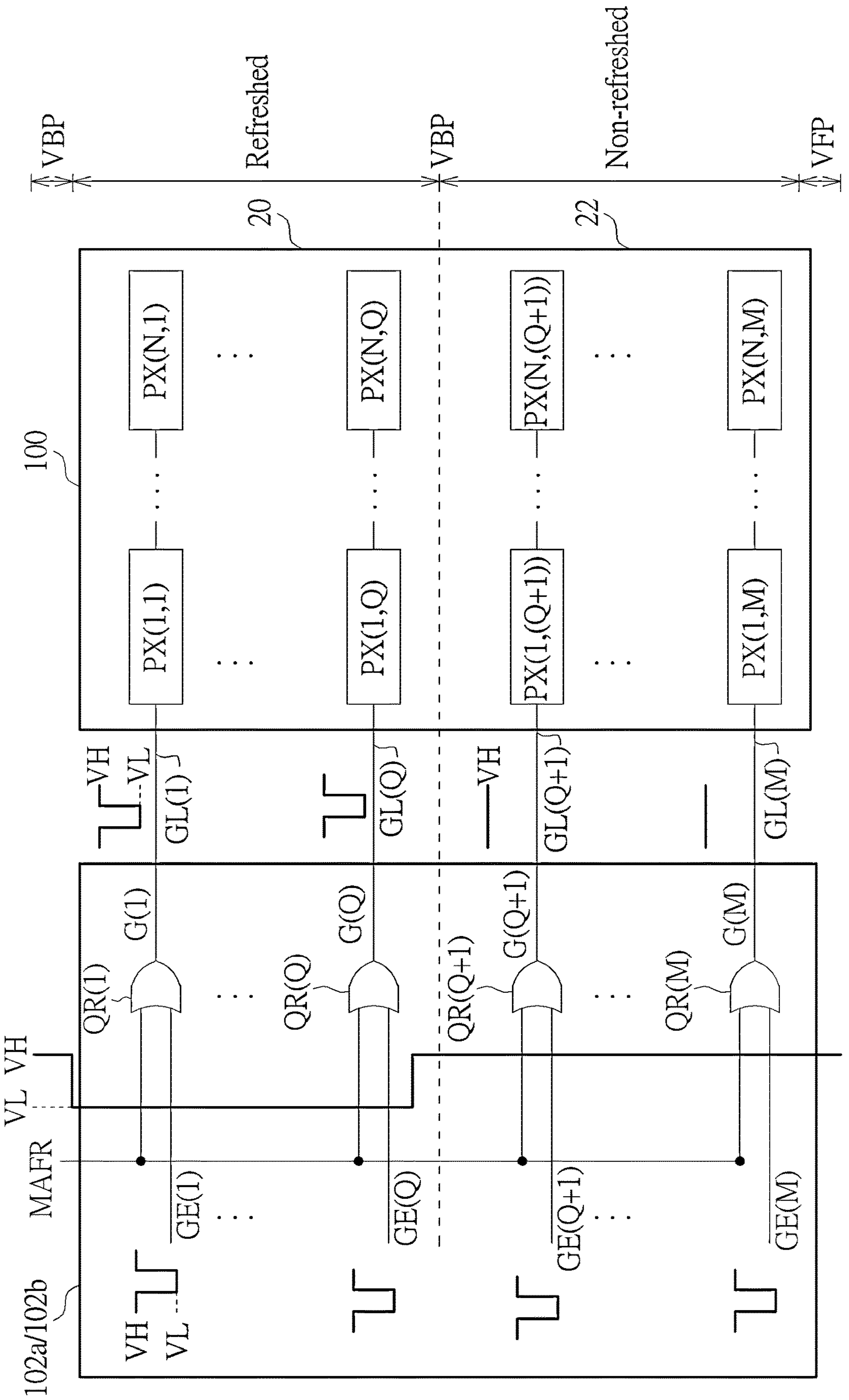
FIG. 4 is a circuit schematic diagram of the GOA driver and the pixel array in FIG. 1, according to an embodiment of the invention.

Step 302 may be explained with reference to FIG. 4. FIG. 4 is a circuit schematic diagram of the GOA driver 102*a*/102*b* and the pixel array 100. The first area may be the high refresh rate area 20, the second area may be the low refresh rate area 22, and the refresh control signal MAFR may define the boundary Bd. The refresh control signal MAFR may be a voltage signal including a low voltage level VL to define the high refresh rate area 20 and a high voltage level VH to define the low refresh rate area 22. The GOA driver 102*a*/102*b* may include OR gates OR(1) to OR(M). Each OR gate OR(m) includes a first input terminal configured to receive the refresh control signal MAFR, a second input terminal configured to receive a gate enable signal GE(m), and an output terminal coupled to the mth row of pixels PX via a gate line GL(m), where m is an integer ranging from 1 to M. The OR gate OR(m) may generate a gate line signal G(m) by performing an OR operation on the refresh control signal MAFR and the gate enable signal GE(m), and transmit the gate line signal G(m) to the mth row of pixels PX. If the refresh control signal MAFR is at the low voltage level VL, the gate enable signal GE(m) may pass through the OR gate OR(m) to generate the gate line signal G(m). That is, a pulse in the gate enable signal GE(m) would appear in the gate line signal G(m), enabling the mth row of pixels PX to load respective data voltages. If the refresh control signal MAFR is at the high voltage level VH, the OR gate OR(m) may block the gate enable signal GE(m), setting the gate line signal G(m) to the high voltage level VH. That is, the gate line signal G(m) remains at the high voltage level VH regardless of the voltage in the gate enable signal GE(m), preventing the mth row of pixels PX from loading the respective data voltages.

FIG. 4 shows the OR gates OR(1) to OR(Q) having the first terminals receiving the refresh control signal MAFR at low voltage VL, and the second terminals sequentially receiving pulses from gate enable signals GE(1) to GE(Q), generating pulses in gate line signals G(1) to G(Q), thereby enabling the 1st to Qth rows of pixels PX to load data voltages in raster order. Q is a positive integer less than M. Thus, the 1st to Qth rows of pixels PX are refreshed, forming the high refresh rate area 20. The OR gates OR(Q+1) to OR(M) have the first terminals receiving the refresh control signal MAFR at the high voltage level VH. Therefore, although the second terminals of the OR gates OR(Q+1) to OR(M) receive pulses from gate enable signals GE(Q+1) to GE(M), the gate line signals G(Q+1) to G(M) are held at high voltage VH, preventing the (Q+1)th to Mth rows of pixels PX from loading the data voltages. Thus, the non-refreshed the (Q+1)th to Mth of the pixels PX define the low refresh rate area 22.

Step 304 may be explained with reference to FIG. 5. FIG. 5 is a circuit schematic diagram of the GOA driver 102*a*/102*b* and a pixel PX in the pixel array 100. The GOA driver 102*a*/102*b* may generate predetermined initial voltages in the initial signals Sini1, Sini2, and Sini3 provided to the refreshed pixel PX according to the first initial voltage. Further, the GOA driver 102*a*/102*b* may selectively generate compensated initial voltages for the initial signals Sini1 and Sini3 provided to the non-refreshed pixel PX according to the second initial voltage. The timing for updating the initial voltages Sini1 and Sini3 remains the same for both the refreshed and non-refreshed pixels PX. The initial signals Sini2 for the non-refreshed pixel PX may remain unrefreshed. In some embodiments, the GOA driver 102*a*/102*b* may either be stopped from generating the initial signals Sini2 or set these signals to a preset voltage (e.g., 0V) for the non-refreshed pixel PX.

The GOA driver 102*a*/102*b* may include driver circuits 50 to 54 to control operations of the pixels PX in the pixel array 100. In some embodiments, the driver circuits 50 to 54 may be implemented in an integrated circuit external to the display panel 10.

The pixel PX may include transistors T1 to T8, a capacitor Cpx, and a light-emitting diode (LED) Dpx. The transistors T1 to T8 may be but are not limited to P-type thin-film transistors, and the LED Dpx may be but is not limited to an organic light-emitting diode.

The capacitor Cpx includes a first terminal coupled to a supply terminal, and a second terminal. The supply terminal may provide a supply voltage VDD, e.g., 8V The transistor T1 (also referred to as the emission control transistor) includes a control terminal coupled to the driver circuit 50 to receive a control signal EM, a first terminal coupled to the supply terminal, and a second terminal. The transistor T2 includes a control terminal coupled to the second terminal of the capacitor Cpx, a first terminal coupled to the second terminal of the transistor T1, and a second terminal. The transistor T3 (also referred to as the driving transistor) includes a control terminal coupled to the driver circuit 54 to receive a control signal GN, a first terminal coupled to the control terminal of the transistor T2, and a second terminal coupled to the second terminal of the transistor T2. The transistor T4 (also referred to as the emission control transistor) includes a control terminal coupled to the driver circuit 50 to receive the control signal EM, a first terminal coupled to the second terminal of the transistor T2, and a second terminal. The LED Dpx includes a first terminal (anode) coupled to the second terminal of the transistor T4, and a second terminal (cathode) coupled to a ground terminal. The ground terminal may provide a ground voltage VSS, e.g., 0V The transistor T5 includes a control terminal coupled to the driver circuit 51 to receive a control signal RH, a first terminal coupled to the second terminal of the transistor T1, and a second terminal configured to receive an initial signal Sini1. The transistor T6 (also referred to as the switch transistor) includes a control terminal coupled to the driver circuit 52 to receive a control signal GP, a first terminal coupled to the second terminal of the transistor T1, and a second terminal configured to receive a data signal VD. The transistor T7 includes a control terminal coupled to the driver circuit 53 to receive a control signal RP, a first terminal coupled to the second terminal of the transistor T2, and a second terminal configured to receive an initial signal Sini2. The transistor T8 includes a control terminal coupled to the driver circuit 51 to receive the control signal RH, a first terminal coupled to the second terminal of the transistor T4, and a second terminal configured to receive an initial signal Sini3.

The LED Dpx may adjust the luminance of the pixel PX according to the driving current supplied by the transistor T2. The transistor T2 may control the amount of the driving current according to the voltage at the node N1. The capacitor Cpx may store the voltage at the node N1. The transistors T1 and T4 may control the timing of light emission according to the control signal EM. The transistor T3 may reset the voltage at the node N1 using the initial signal Sini2 via the transistor T7. The transistor T5 may set the voltage at the node N2 using the initial signal Sini1, enabling fine tuning control over the luminance of the pixel PX. The transistor T6 may pass the data signal VD to the node N2. The transistor T7 may set the voltage at the node N3 using the initial signal Sini2, and may reset the voltage across the capacitor Cpx via the transistor T3. The transistor T8 may set the voltage at the node N4 using the initial signal Sini3, enabling coarse tuning control over the luminance of the pixel PX. In some embodiments, during a data update operation, the transistors T3, T7, T6 may be sequentially turned on, following by the transistor T3 being turned off, following by the transistors T5 and T8 being turned on. The timing of the transistors is not limited to the given example, those skilled in the art would recognize that the transistors of the pixel PX may be turned on in other sequences to satisfy the specific requirements without deviating from the principle of the invention.

The GOA driver 102*a*/102*b* may generate start signals EM_STV, RH_STV, GP_STV, RP_STV, and GN_STV in response to the start vertical signal STV. Upon receiving a pulse in the start vertical signal STV, the GOA driver 102*a*/102*b* may generate corresponding phase-shifted pulses in the signals EM_STV, RH_STV, GP_STV, RP_STV, and GN_STV. The GOA driver 102*a*/102*b* may generate phase-shifted clock signals EM_CKB, RH_CK/RH_CKB, GP_CK/GP_CKB, RP_CK/RP_CKB, and GN_CK/GN_CKB according to the clock signal GCK, where the clock signals RH_CKB, GP_CKB, RP_CKB, and GN_CKB are the inverses of the clock signals RH_CK, GP_CK, RP_CK, and GN_CK, respectively. The GOA driver 102*a*/102*b* may generate signals EM_MAFR, RH_MAFR, GP_MAFR, RP_MAFR, and GN_MAFR at different phases according to the refresh control signal MAFR. Further, the GOA driver 102*a*/102*b* may generate the initial signals Sini1, Sini2, and Sini3 according to the initial signal Sini. The GOA driver 102*a*/102*b* may operate by the supply voltage signal VGH/ground voltage signal VGL, for example, to generate the control signals EM, RH, GP, RP and GN.

The driver circuit 50 may generate the control signal EM according to the start signal EM_STV and the clock signal EM_CK. The driver circuit 51 may generate the control signal RH according to the start signal RH_STV, the clock signals RH_CK/RH_CKB, and the signal RH_MAFR. The driver circuit 52 may generate a control signal GP according to the start signal GP_STV, the clock signals GP_CK/GP_CKB, and the signal GP_MAFR. The driver circuit 53 may generate a control signal RP according to the start signal RP_STV, the clock signals RP_CK/RP_CKB, and the signal RP_MAFR. The driver circuit 54 may receive generate a control signal GN according to the start signal GN_STV, the clock signals GN_CK/GN_CKB, and the signal GN_MAFR. The signals RH_MAFR, GP_MAFR, RP_MAFR and GN_MAFR may be used to control the timing of the control signals RH, GP, RP, and GN, so as to control the luminance of the pixel PX. In some embodiments, the pixel PX may be either located in the refreshed area or the non-refreshed area. The voltage levels of the initial signals Sini1, Sini2, and Sini3 may be set based on the location of the pixel PX. For pixels PX located in the refreshed area, the pixels PX operates under normal conditions. In such a case, the initial signals Sini1, Sini2, and Sini3 are set to predetermined initial voltages to ensure optimal performance during data update operations. On the other hand, the pixels PX located in the non-refreshed area are required to be compensated. Thus, the initial signals Sini1 and/or Sini3 may be selectively adjusted. Each selected initial signal is set to a compensated initial voltage, which differs from the corresponding predetermined initial voltage used in the refreshed area, thereby compensating for the luminance discrepancy between the refreshed area and the non-refreshed area.

In some embodiments, the initial signal Sini1 may be adjusted to compensate for the luminance of the pixel PX in the non-refreshed area, while the initial signals Sini2 and Sini3 may be maintained at fixed voltage levels identical to those pixels PX in the refreshed area. Accordingly, the selective adjustment of the initial signal Sini1 enables fine-tuned compensation of luminance variations, ensuring uniform luminance across the entire pixel array 100. The initial signals Sini2 and Sini3 maintain consistent voltage levels regardless of the location of the pixel PX, simplifying the overall compensation mechanism while still allowing for effective luminance correction. The initial signal Sini1 may be set to the first initial voltage or the second initial voltage based on the location of the pixel PX. The compensation mechanism may involve the driver circuit 51 turning on the transistor T1 of the non-refreshed pixel PX to provide the first initial voltage to the node N2 of the non-refreshed pixel PX, and turning on the transistor T1 of the refreshed pixel PX to provide the second initial voltage to the node N2 of the refreshed pixel PX.

In others embodiments, the initial signals Sini1 and the Sini3 may be adjusted to compensate for the luminance of the pixel PX in the non-refreshed area, while the initial signal Sini2 may be maintained at a fixed voltage level identical to those pixels PX in the refreshed area. Accordingly, the selective adjustments of the initial signals Sini1 and Sini3 enable fine-tuned compensation and coarse-tuned compensation of luminance variations, while maintaining the identical voltage levels of the initial signal Sini2 across the refreshed area and the unrefreshed area simplifies the compensation mechanism. The initial signal Sini1 may be set to the first initial voltage or the second initial voltage based on the location of the pixel PX, and the initial signal Sini3 may be set to the third initial voltage or the fourth initial voltage based on the location of the pixel PX. The compensation mechanism may involve the driver circuit 51 turning on the transistor T1 of the non-refreshed pixel PX to provide the first initial voltage to the node N2 of the non-refreshed pixel PX, turning on the transistor T1 of the refreshed pixel PX to provide the second initial voltage to the node N2 of the refreshed pixel PX, turning on the transistor T8 of the non-refreshed pixel PX to provide the third initial voltage to the node N4 of the non-refreshed pixel PX, and turning on the transistor T8 of the refreshed pixel PX to provide the fourth initial voltage to the node N4 of the refreshed pixel PX.

In other embodiments, the initial signal Sini3 may be adjusted to compensate for the luminance of the pixel PX in the non-refreshed area, while the initial signals Sini1 and Sini2 may be maintained at fixed voltage levels identical to those pixels PX in the refreshed area. Accordingly, the selective adjustment of the initial signal Sini3 enables coarse-tuned compensation of luminance variations, ensuring uniform luminance across the entire pixel array 100. The initial signals Sini1 and Sini2 maintain consistent voltage levels regardless of the location of the pixel PX, simplifying the overall compensation mechanism while still allowing for effective luminance correction. The initial signal Sini3 may be set to the first initial voltage or the second initial voltage based on the location of the pixel PX. The compensation mechanism may involve the driver circuit 51 turning on the transistor T8 of the non-refreshed pixel PX to provide the first initial voltage to the node N4 of the non-refreshed pixel PX, and turning on the transistor T8 of the refreshed pixel PX to provide the second initial voltage to the node N4 of the refreshed pixel PX.

FIG. 6 is a circuit schematic diagram of the GOA driver 602*a*/602*b* and a pixel PX6 in the pixel array 100, according to another embodiment of the invention. The GOA driver 602*a*/602*b* may replace the GOA driver 102*a*/102*b*, and the pixel PX6 may replace the pixel PX in FIG. 5. The GOA driver 602*a*/602*b* may generate predetermined initial voltages for the initial signals Sini2 and Sini3 provided to the refreshed pixel PX6 according to the first initial voltage. Further, the GOA driver 602*a*/602*b* may selectively generate compensated initial voltages for the initial signals Sini2 and Sini3 provided to the non-refreshed pixel PX6 according to the second initial voltage.

The GOA driver 602*a*/602*b* may include driver circuits 60 and 61 to control operations of the pixels PX6. In some embodiments, the driver circuits 60 and 61 may be implemented in an integrated circuit external to the display panel 10.

The pixel PX6 may include transistors T1 to T4, transistors T6 to T8, a capacitor Cpx, and an LED Dpx. The transistors T1 to T4 and T6 to T8 may be but are not limited to P-type thin-film transistors, and the LED Dpx may be but is not limited to an organic light-emitting diode.

The capacitor Cpx includes a first terminal coupled to a supply terminal, and a second terminal. The supply terminal may provide a supply voltage VDD, e.g., 8V. The transistor T1 (also referred to as the emission control transistor) includes a control terminal coupled to the driver circuit 61 to receive a control signal EM, a first terminal coupled to the supply terminal, and a second terminal. The transistor T2 includes a control terminal coupled to the second terminal of the capacitor Cpx, a first terminal coupled to the second terminal of the transistor T1, and a second terminal. The transistor T3 (also referred to as the driving transistor) includes a control terminal coupled to the driver circuit 60 to receive a control signal GP, a first terminal coupled to the control terminal of the transistor T2, and a second terminal coupled to the second terminal of the transistor T2. The transistor T4 (also referred to as the emission control transistor) includes a control terminal coupled to the driver circuit 61 to receive the control signal EM, a first terminal coupled to the second terminal of the transistor T2, and a second terminal. The LED Dpx includes a first terminal (anode) coupled to the second terminal of the transistor T4, and a second terminal (cathode) coupled to a ground terminal. The ground terminal may provide a ground voltage VSS, e.g., 0V. The transistor T6 (also referred to as the switch transistor) includes a control terminal coupled to the driver circuit 60 to receive the control signal GP, a first terminal coupled to the second terminal of the transistor T1, and a second terminal configured to receive a data signal VD. The transistor T7 includes a control terminal coupled to the driver circuit 60 to receive a control signal RP, a first terminal coupled to the second terminal of the capacitor Cpx, and a second terminal configured to receive an initial signal Sini2. The transistor T8 includes a control terminal coupled to the driver circuit 60 to receive the control signal RH, a first terminal coupled to the second terminal of the transistor T4, and a second terminal configured to receive an initial signal Sini3. The operations of transistors T1 to T4 and T6 to T8 may be similar to those in FIG. 5, and explanation therefor would not be repeated here for brevity.

The GOA driver 602*a*/602*b* may generate phase-shifted clock signals CK1, CK2, CK3, and CK4 according to the clock signal GCK. Further, the GOA driver 602*a*/602*b* may generate the initial signals Sini2 and Sini3 according to the initial signal Sini. The GOA driver 602*a*/602*b* may operate by the supply voltage signal VGH/ground voltage signal VGL, for example, to generate the control signals EM, GP, RH, and RP. The driver circuit 60 may generate the control signal GP, RH, and RP according to the start vertical signal STV, the refresh control signal MAFR, and the clock signals CK1, CK2, CK3, and CK4. The driver circuit 61 may generate the control signal EM according to the start vertical signal STV, the refresh control signal MAFR, and the clock signals CK1, CK2, CK3, and CK4.

The voltage levels of the initial signals Sini2, and Sini3 may be selectively compensated based on the location of the pixel PX6.

In other embodiments, the initial signal Sini3 may be adjusted to compensate for the luminance of the pixel PX6 in the non-refreshed area, while the initial signal Sini2 may be maintained at a fixed voltage level identical to those pixels PX in the refreshed area. Accordingly, the selective adjustment of the initial signal Sini3 enables fine-tuned luminance compensation, while maintaining consistent voltage level of the initial signal Sini2 regardless of the location of the pixel PX6 simplifies the overall compensation mechanism. The initial signal Sini3 may be set to the first initial voltage or the second initial voltage based on the location of the pixel PX6. The compensation mechanism may involve the driver circuit 60 turning on the transistor T8 of the non-refreshed pixel PX6 to provide the first initial voltage to the node N4 of the non-refreshed pixel PX6, and turning on the transistor T8 of the refreshed pixel PX6 to provide the second initial voltage to the node N4 of the refreshed pixel PX6.

In other embodiments, the initial signals Sini2 and Sini3 may be adjusted to compensate for the luminance of the pixel PX6 in the non-refreshed area. The initial signal Sini3 may be set to the first initial voltage or the second initial voltage based on the location of the pixel PX6, and the initial signal Sini2 may be set to the third initial voltage or the fourth initial voltage based on the location of the pixel PX6. The compensation mechanism may involve the driver circuit 60 turning on the transistor T8 of the non-refreshed pixel PX6 to provide the first initial voltage to the node N4 of the non-refreshed pixel PX6, and turning on the transistor T8 of the refreshed pixel PX6 to provide the second initial voltage to the node N4 of the refreshed pixel PX6, and the driver circuit 53 turning on the transistor T7 of the non-refresh pixel PX6 to provide the third initial voltage to the second terminal of the capacitor Cpx in the non-refreshed pixel PX6, and turning on the transistor T7 of the refreshed pixel PX6 to provide the fourth initial voltage to the second terminal of the capacitor Cpx in the refreshed pixel PX6.

In other embodiments, the initial signal Sini2 may be adjusted to compensate for the luminance of the pixel PX6 in the non-refreshed area, while the initial signal Sini3 may be maintained at a fixed voltage level identical to those pixels PX in the refreshed area. The initial signal Sini2 may be set to the first initial voltage or the second initial voltage based on the location of the pixel PX6, The compensation mechanism may involve the driver circuit 60 turning on the transistor T7 of the non-refreshed pixel PX6 to provide the first initial voltage to the second terminal of the capacitor Cpx in the non-refreshed pixel PX6, and turning on the transistor T7 of the refreshed pixel PX6 to provide the second initial voltage to the second terminal of the capacitor Cpx in the refreshed pixel PX6

Figure 7:
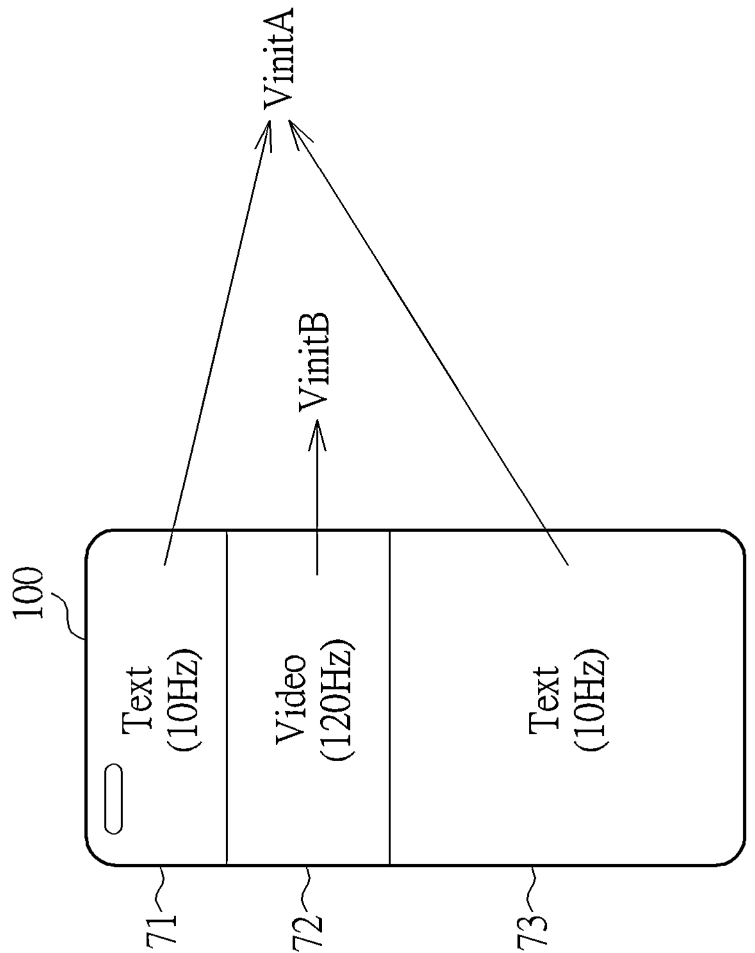
FIG. 7 is a schematic diagram of the MAFR scheme for use by the display device in FIG. 1, according to another embodiment of the invention.

FIG. 7 is a schematic diagram of the MAFR scheme for use by the display device 1, according to another embodiment of the invention. The pixel array 100 is divided into active areas 71 to 73. The active areas 71 and 73 may display text content that requires less frequent updates (e.g., 10 Hz), and the active area 72 may display video content that requires frequent updates (e.g., 120 Hz). While specific refresh rates are shown in FIG. 7, those skilled in the art would recognize that the active areas 71 to 73 may be updated by other refresh rate based on the context displayed.

Figure 8A:
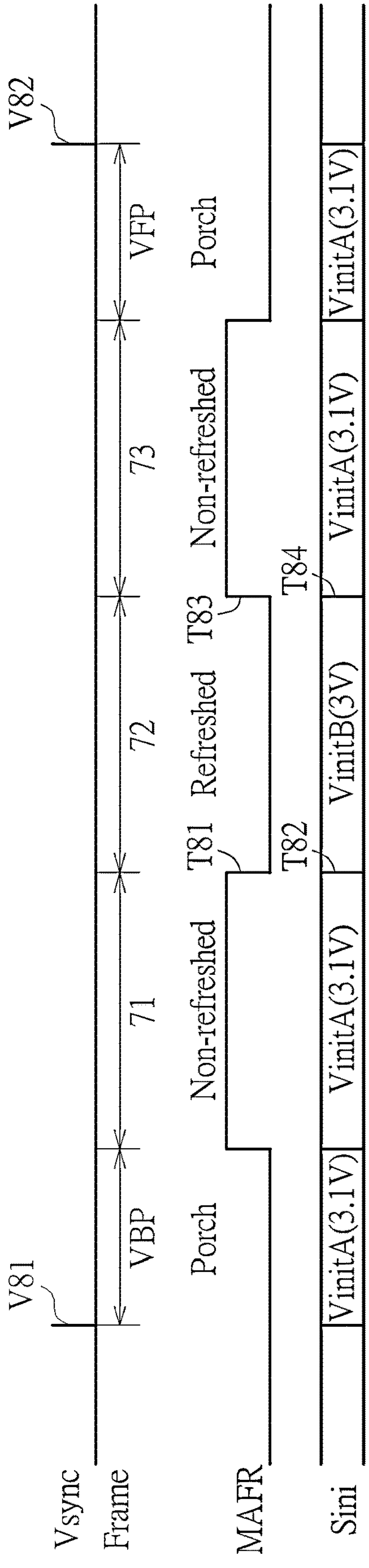
FIG. 8A and FIG. 8B are the timing diagrams of the display device according to the MAFR scheme in FIG. 7.
Figure 8B:
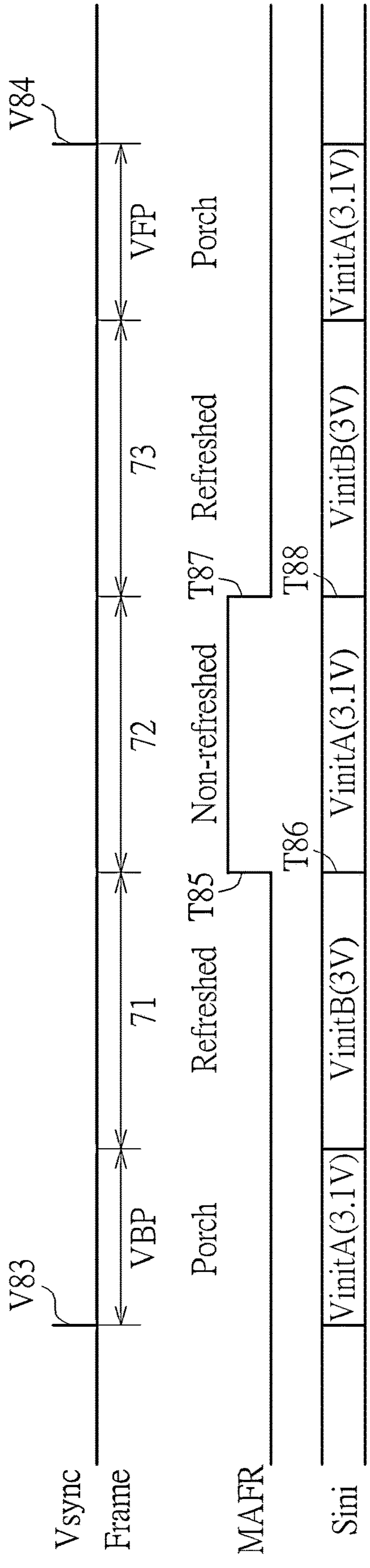

FIGS. 8A and 8B are the timing diagrams of the display device 1 according to the MAFR scheme in FIG. 7. FIGS. 8A and 8B show a partially refreshed frame including a vertical back porch interval VBP, the active areas 71 to 73, and a vertical front porch interval VFP. The initial signal Sini may be transitioned between the initial voltages VinitA and VinitB on the line basis or the clock basis. For the line-based transition, a transition of the initial signal Sini occurs simultaneously with a transition of the refresh control signal MAFR to configure the active areas 71 to 73.

In FIG. 8A, the partially refreshed frame begins at a pulse V81 and ends at a pulse V82 of the Vsync signal. The active areas 71 and 73 are non-refreshed as indicated by the high logic level of the refresh control signal MAFR, and the initial signal Sini is set to the initial voltage VinitA for luminance compensation and flickering reduction. Conversely, the active area 72 are refreshed as indicated by the low logic level of the refresh control signal MAFR, and the initial signal Sini is set to the initial voltage VinitB for performing the data update operation. During intervals of updating the vertical back porch interval VBP and the vertical front porch interval VFP, the initial signal Sini may be set but is not limited to the initial voltage VinitA. In the example, the falling edge transition T81 of the refresh control signal MAFR aligns with the transition T82 from the initial voltage VinitA to the initial voltage VinitB in the initial signal Sini. The rising edge transition T83 of the refresh control signal MAFR aligns with the transition T84 from the initial voltage VinitB to the initial voltage VinitA in the initial signal Sini. The initial voltage VinitA may be but is not limited to 3.1V, and the initial voltage VinitB may be but is not limited to 3V.

In FIG. 8B, the partially refreshed frame begins at a pulse V83 and ends at a pulse V84 of the Vsync signal. The active areas 71 and 73 are refreshed as indicated by the low logic level of the refresh control signal MAFR, and the initial signal Sini is set to the initial voltage VinitB for performing the data update operation. Conversely, the active area 72 is non-refreshed as indicated by the high logic level of the refresh control signal MAFR, and the initial signal Sini is set to the initial voltage VinitA for luminance compensation. During intervals of updating the vertical back porch interval VBP and the vertical front porch interval VFP, the initial signal Sini is set to the initial voltage VinitA. In the example, the rising edge transition T85 of the refresh control signal MAFR aligns with the transition T86 from the initial voltage VinitB to the initial voltage VinitA in the initial signal Sini. The falling edge transition T87 of the refresh control signal MAFR aligns with the transition T88 from the initial voltage VinitA to the initial voltage VinitB in the initial signal Sini.

Figure 9A:
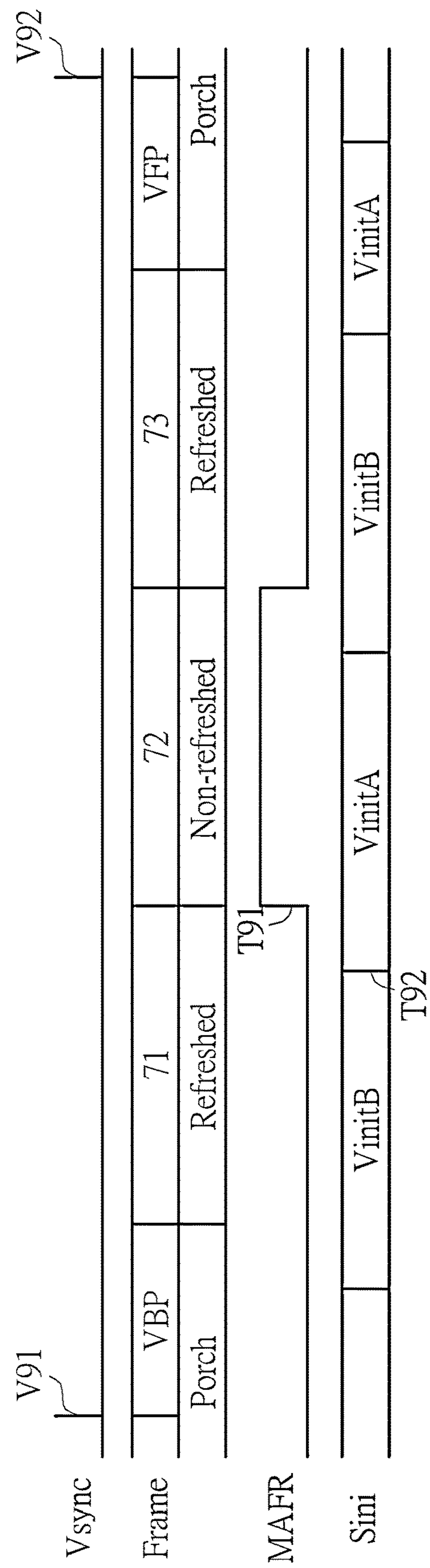
FIG. 9A and FIG. 9B are the timing diagrams of the display device according to the MAFR scheme in FIG. 7, according to another embodiment of the invention.
Figure 9B:
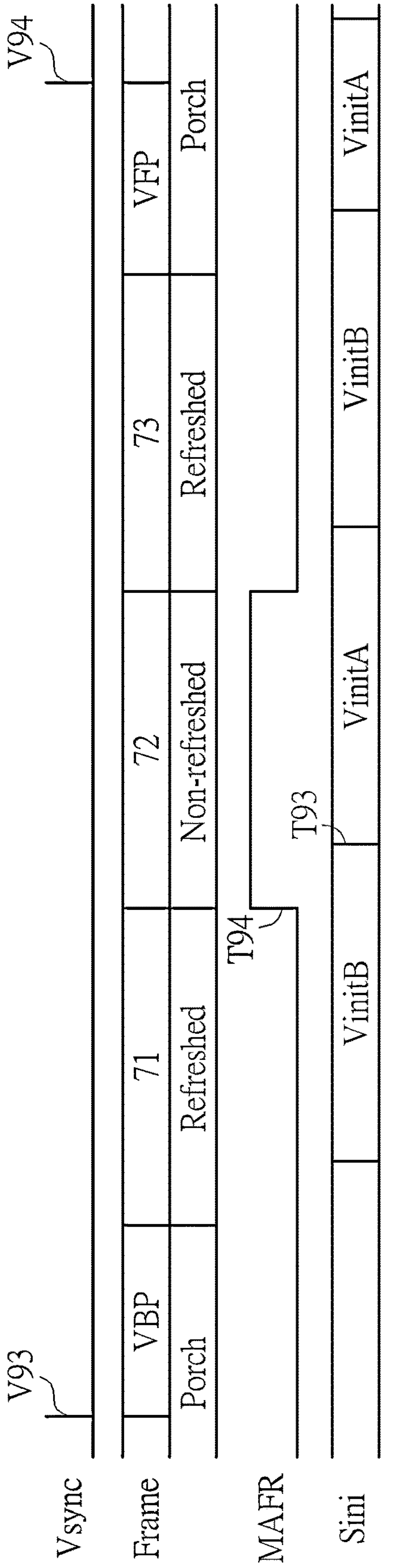

FIGS. 9A and 9B are the timing diagrams of the display device 1 according to the MAFR scheme in FIG. 7, according to another embodiment of the invention. FIGS. 9A and 9B are similar to FIG. 8B, except that the transition of the initial signal Sini leads the transition of the refresh control signal MAFR to configure the active areas 71 to 73 in FIG. 9A, and the transition of the initial signal Sini lags the transition of the refresh control signal MAFR to configure the active areas 71 to 73 in FIG. 9B. FIGS. 9A and 9B address the clock-based transition of the initial signal Sini, the transition of the refresh control signal MAFR and the transition of the initial signal Sini may unaligned. For example, the control circuit 12 may operate at a system clock CLK having a clock period Tck, the duration for 1 line may be equal to 90 clock periods Tck. In FIG. 9A, the partially refreshed frame begins at a pulse V91 and ends at a pulse V92 of the Vsync signal.

The transition T91 of the initial voltage Sini may occur 200 lines (=18000 clock periods Tck) ahead of the transition T92 of the refresh control signal MAFR. As a result, the GOA drivers 102*a* and 102*b* may have sufficient time to generate the compensated initial voltage for the initial signals Sini1, Sini2, and/or Sini3 in response to the transition of the initial voltage Sini. In FIG. 9B, the partially refreshed frame begins at a pulse V93 and ends at a pulse V94 of the Vsync signal. The transition T93 of the initial voltage Sini may occur 200 lines (=18000 clock periods Tck) after the transition T94 of the refresh control signal MAFR.

Figure 10:
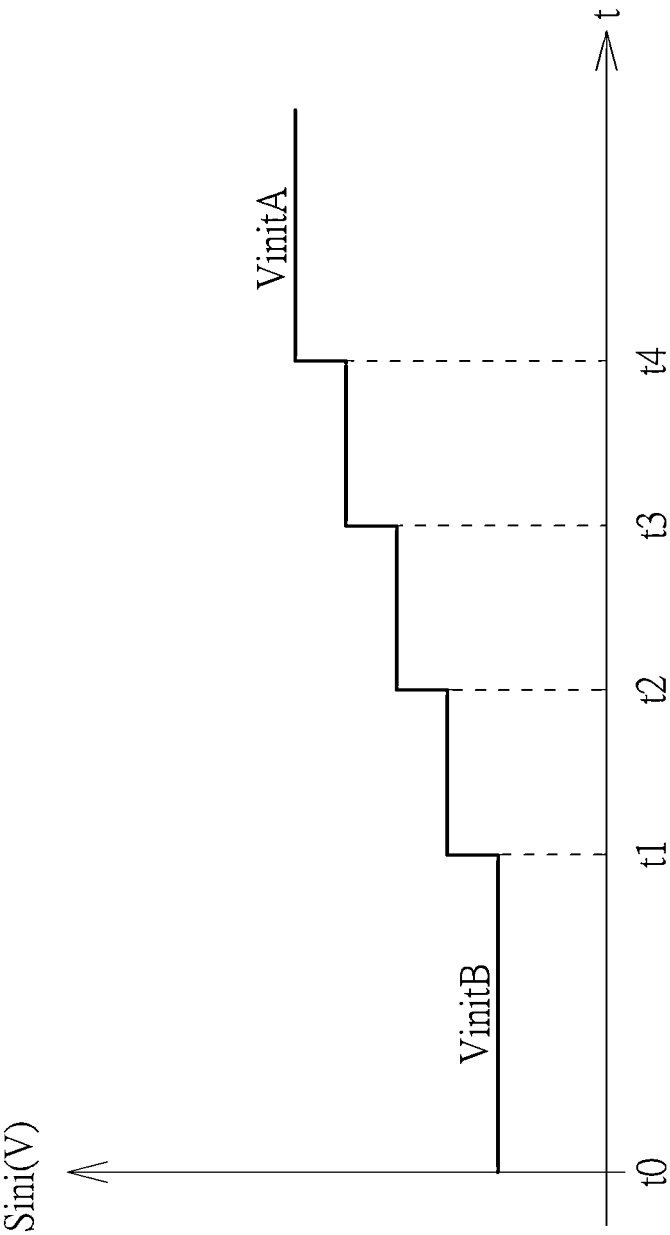
FIG. 10 is a waveform of the initial signal in FIG. 1.

FIG. 10 is a waveform of the initial signal Sini transitioning from the initial voltage VinitA to the initial voltage VinitB, where the horizontal axis represents time t and the vertical axis represents initial signal Sini in volts (V). The transition of the initial signal Sini may be stepwise. The initial signal Sini may be set to the initial voltage VinitB at Time t0, and stepwise increased from the initial voltage VinitB before Time t1 to the initial voltage VinitA after Time t4 through 3 intermediate voltage levels. The stepwise transition may reduce undesired noise in the display device 1.

Figure 11:
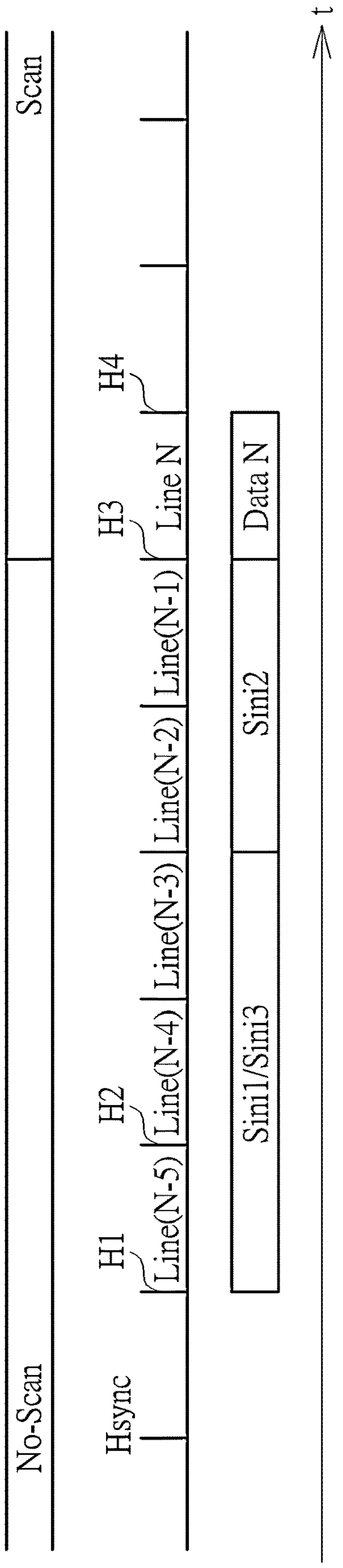
FIG. 11 is the schematic diagram of the initial signals of a refreshed pixel PX in FIG. 5.

FIG. 11 is the schematic diagram of the initial signals Sini1/Sini2/Sini3 of a refreshed pixel PX in the Nth line according to another embodiment of the invention, where the horizontal axis represents time. Each pulse in the horizontal synchronization (Hsync) signal represents the start of a line. For example, Line (N−5) starts at a pulse H1 and ends at a pulse H2 of the Hsync signal, and Line N starts at a pulse H3 and ends at a pulse H4 of the Hsync signal. In the pixel PX, the nodes N2 and/or N4 may be initialized using the initial signals Sinit1 and/or Vinit3 for a duration of 3 lines, then the node N3 may be initialized using the initial signal Sinit2 for a duration of 2 lines, followed by the node N2 receiving the pixel data Data N for a duration of 1 line. Thus, the pixel PX requires 6 lines to complete the data update operation. In some embodiments, the nodes N2 and/or N4 may be initialized by the initial signals Sinit1 and/or Vinit3 from Line (N−5) to the (N−3), the node N3 may be initialized by the initial signal Sinit2 from Line (N−3) to the (N−1), and then the node N2 may be set by the pixel data Data N during the Line N, completing the initialization before feeding the pixel data Data N.

Figure 12:
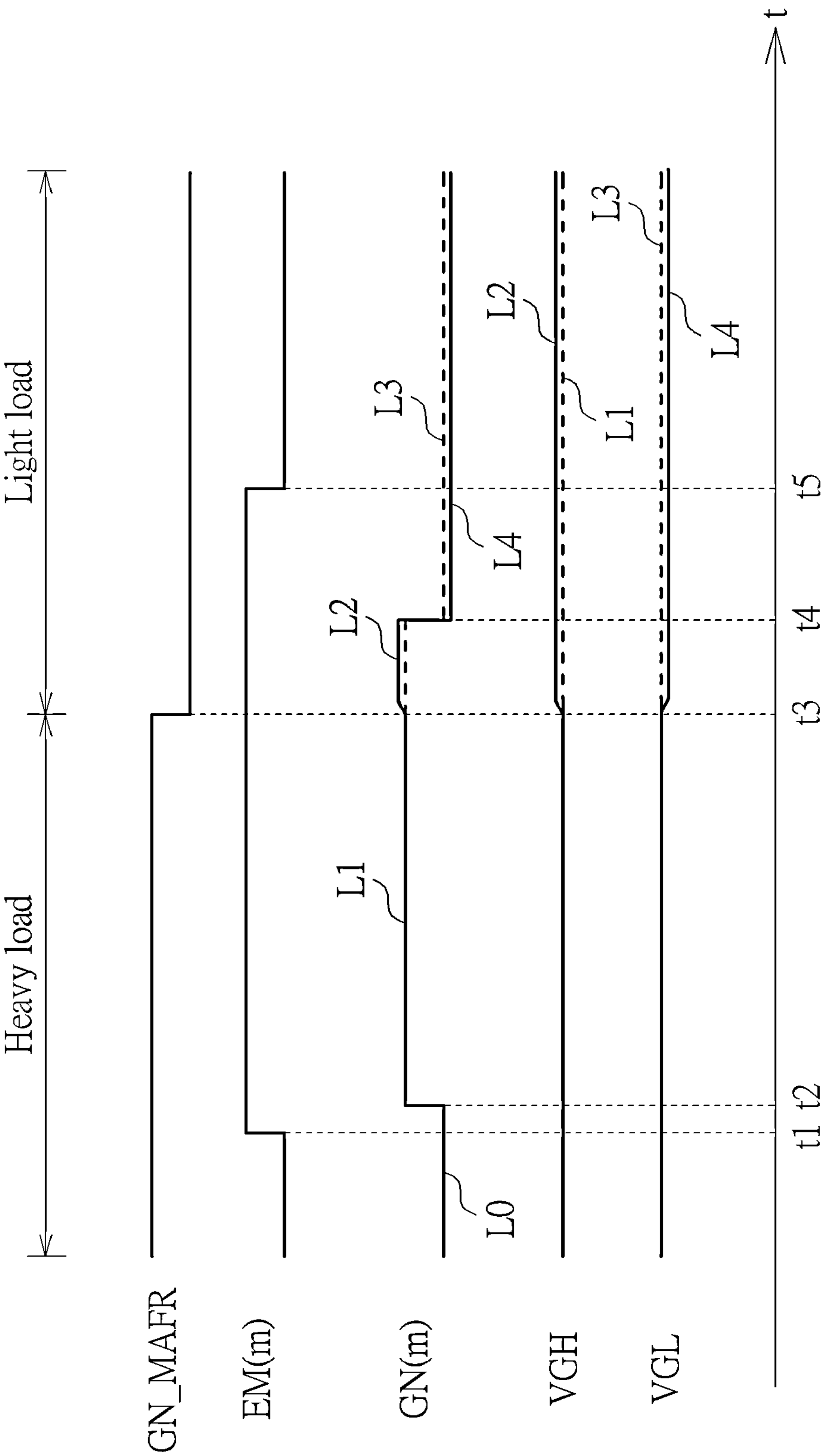
FIG. 12 is a timing diagram of a display panel in the related art.

FIG. 12 is a timing diagram of a display panel in the related art, where the horizontal axis represents time t and the vertical axis represents various signals in volts (V). The signal GN_MAFR controls the state of the control signal GN(m). The supply voltage signal VGH sets the high voltage levels of the control signal GN(m), while the ground voltage signal VGL sets the low voltage levels of the control signal GN(m). When the signal GN_MAFR toggles from a high logic level to a low logic level, both the supply voltage signal VGH and the ground voltage signal VGL may experience different loading conditions, leading to variations in levels of the supply voltage signal VGH and the ground voltage signal VGL, respectively.

At Time t1, the control signal EM(m) transitions from the low logic level to the high logic level. The signal GN_MAFR is set to the logic high level, resulting in a heavy load condition from the perspective of the supply voltage signal VGH and the ground voltage signal VGL.

At Time t2, the control signal GN(m) transitions from the low voltage level L0 to the high voltage level L1, preventing the pixel PX from being refreshed. The low voltage level L0 may be set by the first ground voltage of the ground voltage signal VGL. The high voltage level L1 may be set by the first supply voltage of the supply voltage signal VGH.

At Time t3, the signal GN_MAFR transitions from the high logic level to the low logic level, preparing the control signal GN(m) to be transition from the high state to the low state. The supply voltage signal VGH and the ground voltage signal VGL may experience a light load condition once the signal GN_MAFR being transition to the low state. Consequently, the supply voltage signal VGH may become higher and the ground voltage signal VGL may become lower due to the light load condition. In the embodiments, in the light load condition, the supply voltage signal VGH may be increased from the high voltage level L1 to the high voltage level L2, while the ground voltage signal VGL may be decreased from the low voltage level L3 to the low voltage level L4. The high voltage level L1 may be +8V, the high voltage level L2 may be +9V, the low voltage level L3 may be −8V, the high voltage level L4 may be −9V.

Between Time t3 and Time t4, the control signal GN(m) is set to the high logic level L2 due to the increased voltage level in the supply voltage signal VGH.

After Time t4, the control signal GN(m) is set to the low logic level L4 due to the decreased voltage level in the ground voltage signal VGL.

At Time t5, the control signal EM(m) transitions from the high logic level to the low logic level.

Accordingly, the voltage difference between the high voltage level and the low voltage level of the control signal GN(m) is expanded in the light load condition, generating even more capacitive coupling in the light load condition than the heavy load condition, affecting the voltages across the capacitors Cpx, leading to a severe flickering effect on the pixel array 100.

Figure 13:
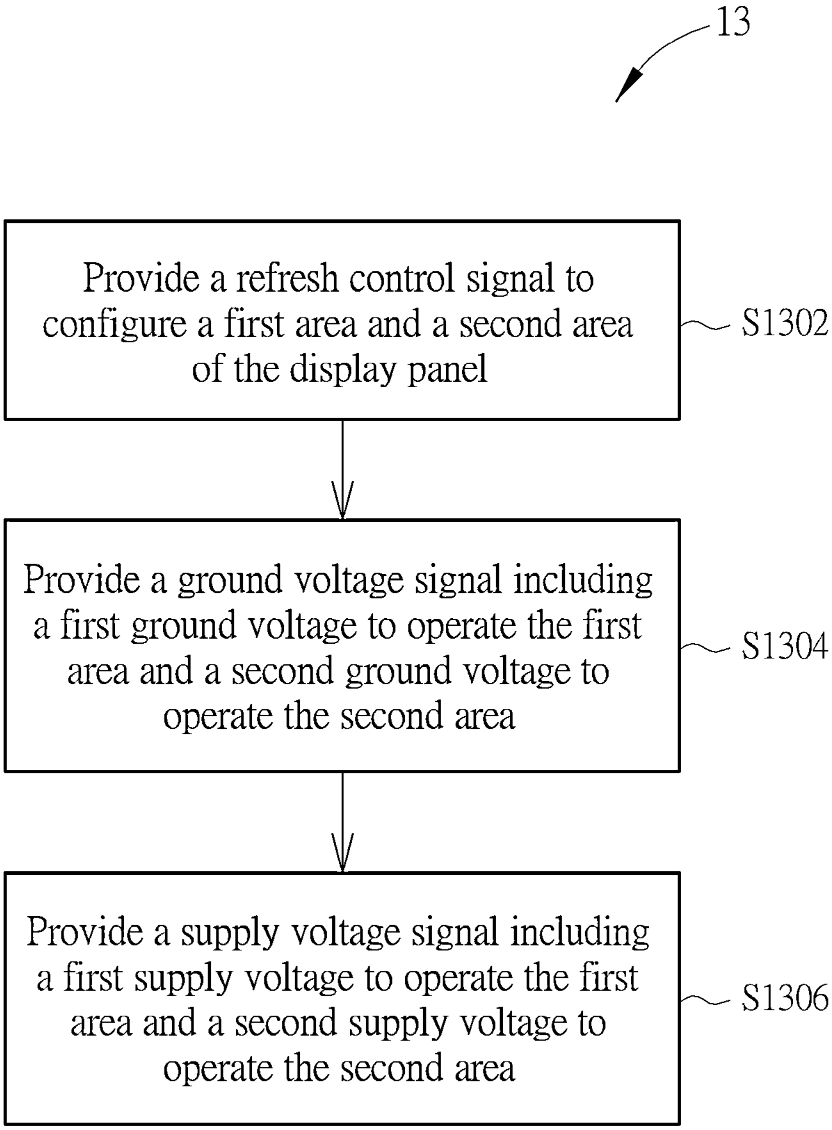
FIG. 13 is a flowchart of a method of compensating the display panel using the supply voltage signal and/or the ground voltage signal.

FIG. 13 is a flowchart of a method of compensating the display panel using the supply voltage signal VGH and/or the ground voltage signal VGL. The method 13 includes Steps S1302 to S1306, reducing flickering effect on the pixel array 100. Any reasonable step change or adjustment is within the scope of the present disclosure. Steps S1302 to S1306 are detailed as follows:

Step S1302: The control circuit 12 provides a refresh control signal MAFR to configure a first area and a second area of the display panel 10;

Step S1304: The control circuit 12 provides a ground voltage signal VGL including a first ground voltage to operate the first area and a second ground voltage to operate the second area; and Step S1306: The control circuit 12 provides a supply voltage signal VGH including a first supply voltage to operate the first area and a second supply voltage to operate the second area.

In Step S1302, the first area may be referred to as the refreshed (scanned) area, and the pixels PX positioned in the first area may be refreshed. The second area may be referred to as the non-refreshed (non-scanned) area, and the pixels PX in the second area may remain non-refreshed.

In Step S1304, the control circuit 12 delivers two different ground voltages to the display panel 10 via the ground voltage signal VGL. The first ground voltage may be lower than the second ground voltage to compensate for the flickering effect. In some embodiments, the control circuit 12 may determine the first ground voltage according to a ratio of the first area to a full active area of the pixel array 100. The transition of the ground voltage signal VGL may occur simultaneously with a transition of the refresh control signal MAFR to configure the second area. In some embodiments, the transition of the ground voltage signal VGL may lead the transition of the refresh control signal to configure the second area, providing sufficient time for the GOA driver 102*a*/102*b* to generate the signals using the updated ground voltage in the ground voltage signal VGL. In some embodiments, the transition of the ground voltage signal VGL may lag the transition of the refresh control signal to configure the second area.

Likewise, in Step S1306, the control circuit 12 delivers two different supply voltages to the display panel 10 via the supply voltage signal VGH. The first supply voltage may be higher than the second supply voltage to compensate for the flickering effect. In some embodiments, the control circuit 12 may determine the first supply voltage according to a ratio of the first area to a full active area of the pixel array 100. The transition of the supply voltage signal VGH may occur simultaneously with a transition of the refresh control signal MAFR to configure the second area. In some embodiments, the transition of the supply voltage signal VGH may lead the transition of the refresh control signal to configure the second area, providing sufficient time for the GOA driver 102*a*/102*b* to generate the signals using the updated ground voltage in the supply voltage signal VGH. In some embodiments, the transition of the supply voltage signal VGH may lag the transition of the refresh control signal to configure the second area.

The first ground voltage and the first supply voltage are applied to the pixels PX in the first area, and the second ground voltage and the second supply voltage are applied to the pixels PX in the second area, thereby reducing the flickering effect.

Figure 14A:
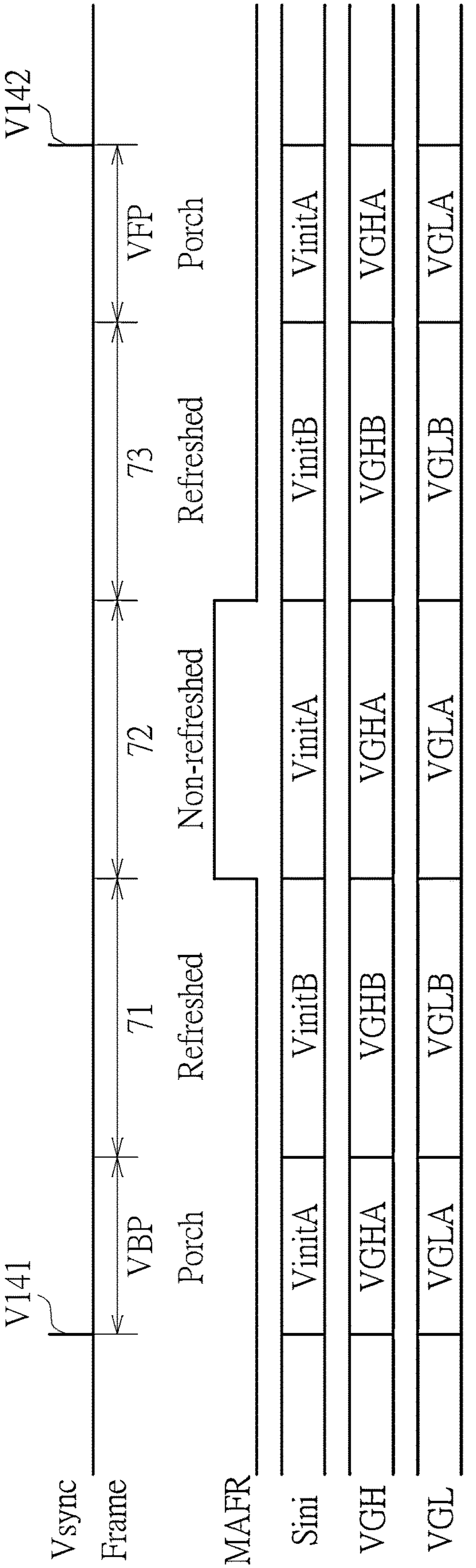
FIG. 14A and FIG. 14B are timing diagrams of the display device, according to another embodiment of the invention.
Figure 14B:
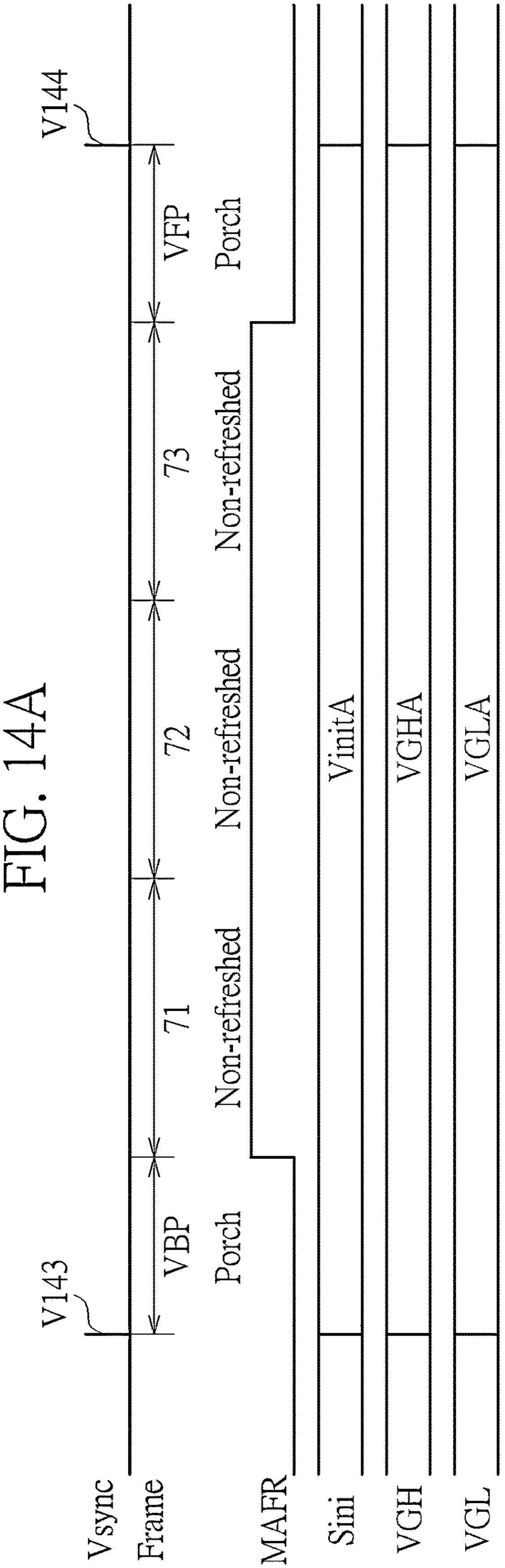

The display device 1 may use the methods 3 and 13 either independently or together. FIGS. 14A and 14B are timing diagrams of the display device 1 adopting both the methods 3 and 13 according to the MAFR scheme in FIG. 7. FIGS. 14A and 14B show a partially refreshed frame including the vertical back porch interval VBP, the active areas 71 to 73, and the vertical front porch interval VFP. The initial signal Sini may be transitioned between the initial voltages VinitA and VinitB. The supply voltage signal VGH may be transitioned between the supply voltages VGHA and VGHB. The ground voltage signal VGL may be transitioned between the ground voltages VGLA and VGLB.

In FIG. 14A, the partially refreshed frame begins at a pulse V141 and ends at a pulse V142 of the Vsync signal. The active areas 71 and 73 are refreshed as indicated by the low logic level of the refresh control signal MAFR, the initial signal Sini is set to the initial voltage VinitB, the supply voltage signal VGH is set to the supply voltage VGHB and the ground voltage signal VGL is set to the ground voltage VGLB, so as to perform the data update operation. Conversely, the active area 72 are non-refreshed as indicated by the high logic level of the refresh control signal MAFR, the initial signal Sini is set to the initial voltage VinitA for luminance compensation, and the supply voltage signal VGH is set to the supply voltage VGHA and the ground voltage signal VGL is set to the ground voltage VGLA for flickering reduction. During intervals of updating the vertical back porch interval VBP and the vertical front porch interval VFP, the initial signal Sini may be set but is not limited to the initial voltage VinitA, the supply voltage signal VGH may be set but is not limited to the supply voltage VGHA and the ground voltage signal VGL may be set but is not limited to the ground voltage VGLA. The transition of the refresh control signal MAFR may align with the transitions of the initial signal Sini, the supply voltage signal VGH and the ground voltage signal VGL.

In FIG. 14B, the partially refreshed frame begins at a pulse V143 and ends at a pulse V144 of the Vsync signal. The active areas 71 to 73 are non-refreshed as indicated by the low logic level of the refresh control signal MAFR, the initial signal Sini is set to the initial voltage VinitA for luminance compensation, and the supply voltage signal VGH is set to the supply voltage VGHA and the ground voltage signal VGL is set to the ground voltage VGLA for flickering reduction. During intervals of updating the vertical back porch interval VBP and the vertical front porch interval VFP, the initial signal Sini may be set but is not limited to the initial voltage VinitA, the supply voltage signal VGH may be set but is not limited to the supply voltage VGHA and the ground voltage signal VGL may be set but is not limited to the ground voltage VGLA. The transition of the refresh control signal MAFR may align with the transitions of the initial signal Sini, the supply voltage signal VGH and the ground voltage signal VGL.

For different luminance in the pixel array 100, the control circuit 12 may output different voltages Vinit for the refreshed areas and the non-refreshed areas. For example, for a luminance of 100 nits, the control circuit 12 may output the initial voltages VinitB and VinitA for the refreshed frame and the non-refreshed frame, respectively. For a luminance of 2 nits, the control circuit 12 may output the initial voltages VinitB2 and VinitA2 for the refreshed frame and the non-refreshed frame, respectively. The initial voltages VinitA and VinitA2 may be different in value, and the initial voltages VinitB and VinitB2 may be different in value. The control circuit 12 may hold a voltage lookup table for determining a suitable initial voltage for a given luminance.

Figure 15A:
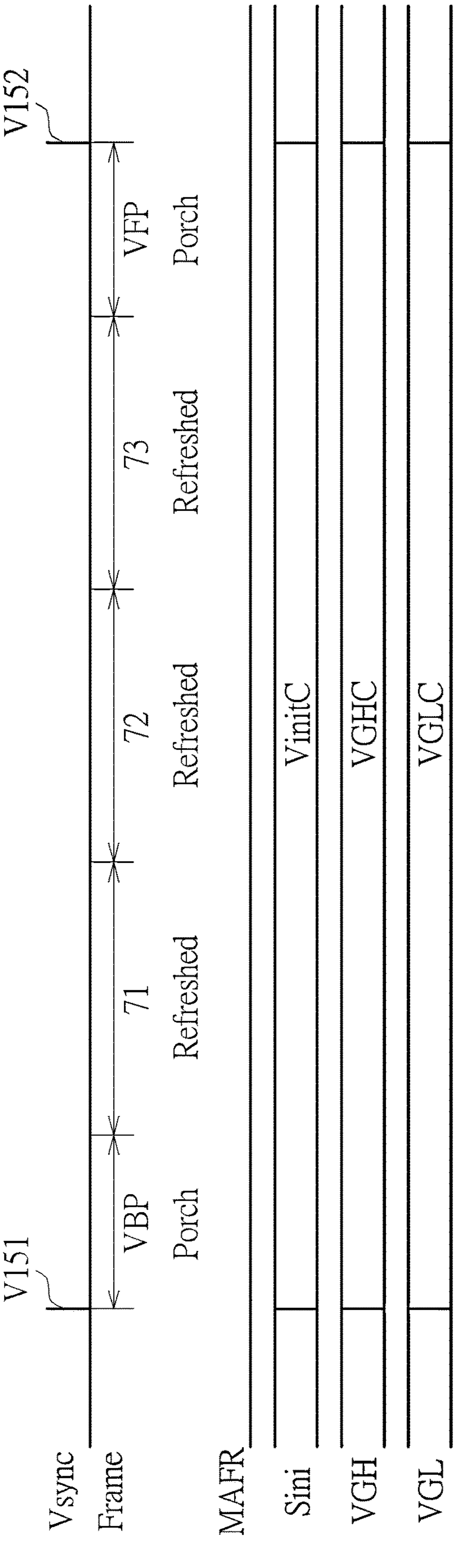
FIG. 15A, FIG. 15B and FIG. 15C are timing diagrams of the display device, according to another embodiment of the invention.
Figure 15B:
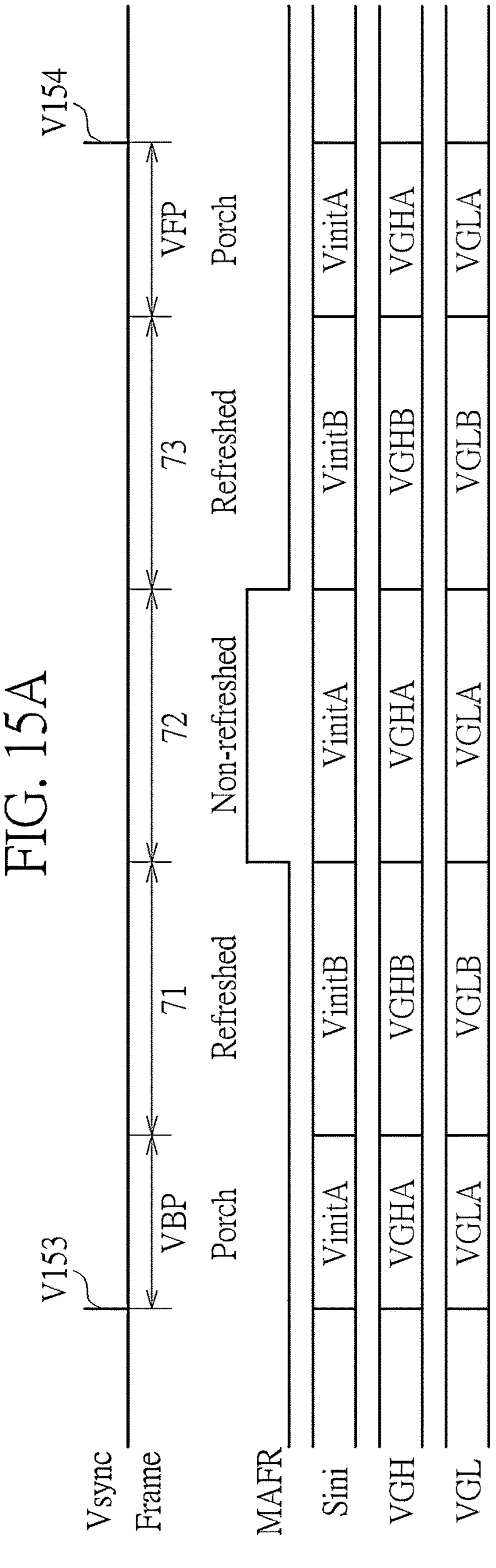
Figure 15C:
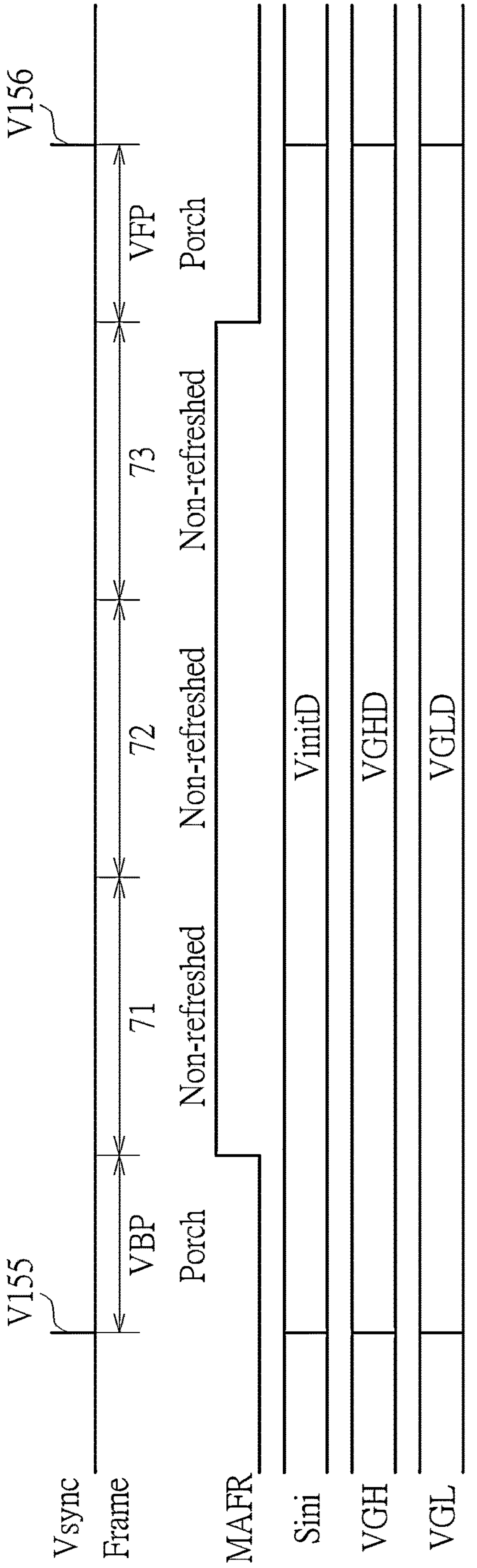

FIGS. 15A to 15C are timing diagrams of the display device 1 adopting both the methods 3 and 14 according to the MAFR scheme in FIG. 7, according to another embodiment of the invention. FIGS. 15A to 15C show a partially refreshed frame including the vertical back porch interval VBP, the active areas 71 to 73, and the vertical front porch interval VFP. In FIG. 15A, the partially refreshed frame begins at a pulse V151 and ends at a pulse V152 of the Vsync signal. In FIG. 15B, the partially refreshed frame begins at a pulse V153 and ends at a pulse V154 of the Vsync signal. In FIG. 15C, the partially refreshed frame begins at a pulse V155 and ends at a pulse V156 of the Vsync signal. The initial signal Sini may be transitioned between any two of the initial voltages VinitA to VinitD. The supply voltage signal VGH may be transitioned between any two of the supply voltages VGHA to VGHD. The ground voltage signal VGL may be transitioned between any two of the ground voltages VGLA to VGLD.

In some embodiments, the initial voltages may be provided to the pixel array 100 according to the ratio of the non-refreshed areas to the full area of the pixel array 100, as shown in FIGS. 15A to 15C. For example, if the control circuit 12 needs to refresh the entire screen, the initial voltage VinitC and the high voltage levels VGH-C/VGL-C are used. If the control circuit 12 does not refresh the entire screen, the initial voltage VinitD and the high voltage levels VGH-D/VGL-D are used. If the non-refreshed area occupies 80% of the entire screen, the initial voltage VinitA-1 and the high voltage levels VGH-A1/VGL-A1 are used. If the non-refreshed area occupies 5% of the entire screen, the initial voltage VinitA-2 and the high voltage levels VGH- A2/VGL-A2 are used. The control circuit 12 may hold a voltage lookup table for determining a suitable initial voltage for a given ratio.

The embodiments of the invention provide methods of compensating a display panel by adjusting the initial voltage signal, the supply voltage signal and the ground voltage signal, thereby removing the luminance discrepancy and mitigating the flickering effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of compensating a display panel, the method comprising:

providing a refresh control signal to configure a first area and a second area of the display panel; and providing an initial signal to the display panel, the initial signal including a first initial voltage to initialize the first area to a first initial condition before a data update, and a second initial voltage to initialize the second area to a second initial condition without performing any data update.

2. The method of claim 1, wherein a transition of the initial signal occurs simultaneously with a transition of the refresh control signal to configure the first area.

3. The method of claim 1, wherein a transition of the initial signal leads a transition of the refresh control signal to configure the first area.

4. The method of claim 1, wherein the initial signal transitions in a stepwise manner.

5. The method of claim 1, further comprising:

providing a supply voltage signal including a first supply voltage to operate the first area and a second supply voltage to operate the second area.

6. The method of claim 5, further comprising:

determining the first supply voltage according to a ratio of the first area to a full active area of the display panel.

7. The method of claim 5, wherein the first supply voltage is higher than the second supply voltage.

8. The method of claim 1, further comprising:

providing a ground voltage signal including a first ground voltage to operate the first area and a second ground voltage to operate the second area.

9. The method of claim 8, further comprising:

determining the first ground voltage according to a ratio of the first area to a full active area of the display panel.

10. The method of claim 8, wherein the first ground voltage is lower than the second ground voltage.

11. The method of claim 1, wherein the display panel comprises a driver circuit and an array of pixels, each pixel comprising:

a capacitor comprising a first terminal coupled to a supply terminal, and a second terminal;

a first transistor comprising a control terminal, a first terminal coupled to the supply terminal, and a second terminal;

a second transistor comprising a control terminal coupled to the second terminal of the capacitor, a first terminal coupled to the second terminal of the first transistor, and a second terminal;

a third transistor comprising a control terminal, a first terminal coupled to the second terminal of the capacitor, and a second terminal coupled to the second terminal of the second transistor;

a fourth transistor comprising a control terminal, a first terminal coupled to the second terminal of the second transistor, and a second terminal;

a light-emitting diode comprising a first terminal coupled to the second terminal of the fourth transistor, and a second terminal coupled to a ground terminal;

a fifth transistor comprising a control terminal coupled to the driver circuit, a first terminal coupled to the second terminal of the first transistor, and a second terminal;

a sixth transistor comprising a control terminal coupled to the driver circuit, a first terminal coupled to the second terminal of the first transistor, and a second terminal configured to receive a data signal;

a seventh transistor comprising a control terminal coupled to the driver circuit, a first terminal coupled to the second terminal of the second transistor, and a second terminal; and an eighth transistor comprising a control terminal coupled to the driver circuit, a first terminal coupled to the second terminal of the fourth transistor, and a second terminal.

12. The method of claim 11, further comprising:

the driver circuit turning on the fifth transistor of a pixel in the first area to provide the first initial voltage to the second terminal of the first transistor of the pixel in the first area; and the driver circuit turning on the fifth transistor of a pixel in the second area to provide the second initial voltage to the second terminal of the first transistor of the pixel in the second area.

13. The method of claim 12, further comprising:

the driver circuit turning on the eighth transistor of the pixel in the first area to provide a third initial voltage to the second terminal of the fourth transistor of the pixel in the first area; and the driver circuit turning on the eighth transistor of the pixel in the second area to provide a fourth initial voltage to the second terminal of the fourth transistor of the pixel in the second area.

14. The method of claim 11, further comprising:

the driver circuit turning on the eighth transistor of a pixel in the first area to provide the first initial voltage to the second terminal of the fourth transistor of the pixel in the first area; and the driver circuit turning on the eighth transistor of a pixel in the second area to provide the second initial voltage to the second terminal of the fourth transistor of the pixel in the second area.

15. The method of claim 1, wherein the display panel comprises a driver circuit and an array of pixels, each pixel comprising:

a capacitor comprising a first terminal coupled to a supply terminal, and a second terminal;

a first transistor comprising a control terminal, a first terminal coupled to the supply terminal, and a second terminal;

a second transistor comprising a control terminal coupled to the second terminal of the capacitor, a first terminal coupled to the second terminal of the first transistor, and a second terminal;

a third transistor comprising a control terminal, a first terminal coupled to the second terminal of the capacitor, and a second terminal coupled to the second terminal of the second transistor;

a fourth transistor comprising a control terminal, a first terminal coupled to the second terminal of the second transistor, and a second terminal;

a light-emitting diode (LED) comprising a first terminal coupled to the second terminal of the fourth transistor, and a second terminal coupled to a ground terminal;

a fifth transistor comprising a control terminal coupled to the driver circuit, a first terminal coupled to the second terminal of the capacitor, and a second terminal;

a sixth transistor comprising a control terminal coupled to the driver circuit, a first terminal coupled to the second terminal of the first transistor, and a second terminal configured to receive a data signal; and a seventh transistor comprising a control terminal coupled to the driver circuit, a first terminal coupled to the second terminal of the fourth transistor, and a second terminal.

16. The method of claim 15, further comprising:

the driver circuit turning on the seventh transistor of a pixel in the first area to provide the first initial voltage to the second terminal of the fourth transistor of the pixel in the first area; and the driver circuit turning on the seventh transistor of a pixel in the second area to provide the second initial voltage to the second terminal of the fourth transistor of the pixel in the second area.

17. The method of claim 16, further comprising:

the driver circuit turning on the fifth transistor of the pixel in the first area to provide a third initial voltage to the second terminal of the capacitor of the pixel in the first area; and the driver circuit turning on the fifth transistor of the pixel in the second area to provide a fourth initial voltage to the second terminal of the capacitor of the pixel in the second area.

18. The method of claim 15, further comprising:

the driver circuit turning on the fifth transistor of the pixel in the first area to provide the first initial voltage to the second terminal of the capacitor of the pixel in the first area; and the driver circuit turning on the fifth transistor of the pixel in the second area to provide the second initial voltage to the second terminal of the capacitor of the pixel in the second area.

19. A method of compensating a display panel, the method comprising:

providing a refresh control signal to configure a first area and a second area of the display panel; and providing a ground voltage signal including a first ground voltage to operate the first area and a second ground voltage to operate the second area;

wherein the first area is refreshed and the second area is unrefreshed.

20. The method of claim 19, further comprising:

determining the first ground voltage according to a ratio of the first area to a full active area of the display panel.

21. The method of claim 19, wherein the first ground voltage is lower than the second ground voltage.

22. The method of claim 19, wherein a transition of the ground voltage signal occurs simultaneously with a transition of the refresh control signal to configure the second area.

23. The method of claim 19, wherein a transition of the ground voltage signal leads a transition of the refresh control signal to configure the second area.

24. The method of claim 19, further comprising:

providing a supply voltage signal including a first supply voltage to operate the first area and a second supply voltage to operate the second area.

25. The method of claim 24, further comprising:

determining the first supply voltage according to a ratio of the first area to a full active area of the display panel.

26. The method of claim 24, wherein the first supply voltage is higher than the second supply voltage.

27. The method of claim 24, wherein a transition of the supply voltage signal occurs simultaneously with a transition of the refresh control signal to configure the second area.

28. The method of claim 24, wherein a transition of the supply voltage signal leads a transition of the refresh control signal to configure the second area.

* * * * *